(12) United States Patent
Tomioka

(10) Patent No.: US 7,305,187 B2
(45) Date of Patent: Dec. 4, 2007

(54) OPTICAL COMMUNICATIONS SYSTEM

(75) Inventor: Tazuko Tomioka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/401,289

(22) Filed: Apr. 11, 2006

(65) Prior Publication Data
US 2006/0182447 A1 Aug. 17, 2006

Related U.S. Application Data

(62) Division of application No. 09/950,652, filed on Sep. 13, 2001, now Pat. No. 7,046,933.

(30) Foreign Application Priority Data

Sep. 29, 2000 (JP) ............................ 2000-300440

(51) Int. Cl.
*H04B 10/00* (2006.01)
(52) U.S. Cl. .............................. 398/63; 398/5; 398/67; 398/70; 398/72
(58) Field of Classification Search ................ 398/4–5, 398/59–60, 63–64, 66–68, 70–73
See application file for complete search history.

(56) References Cited

U.S. PATENT DOCUMENTS

| | | | |
|---|---|---|---|
| 5,189,541 A | 2/1993 | Konishi | ........................ 398/59 |
| 6,590,681 B1 * | 7/2003 | Egnell et al. | ................. 398/82 |
| H2075 H | 8/2003 | Gnauck et al. | ............. 398/118 |

FOREIGN PATENT DOCUMENTS

| | | |
|---|---|---|
| EP | 0 361 368 | 4/1990 |
| EP | 0 392 490 | 10/1990 |
| EP | 0 786 878 | 7/1997 |
| JP | 58-60842 | 4/1983 |
| JP | 63-227227 | 9/1988 |
| JP | 3-125101 | 5/1991 |
| JP | 5-191358 | 7/1993 |
| JP | 9-270754 | 10/1997 |

OTHER PUBLICATIONS

Nozomu Matsuo, et al., "The Experimental Study of the Influence of Optical Beat Interference on FM-video Transmission System Employing 30ch Multiple Optical Carriers", ECOC '94 Proceedings—20th European Conference on Optical Communication, vol. 2, Sep. 25-29, 1994, pp. 857-860.

(Continued)

*Primary Examiner*—Leslie Pascal
(74) *Attorney, Agent, or Firm*—Oblon, Spivak, McClelland, Maier & Neustadt, P.C.

(57) ABSTRACT

An optical communication system comprises a base station, a plurality of trunk optical fibers connected to the base station, a plurality of star couplers connected to the trunk optical fibers, a plurality of remote stations, and a plurality of branch optical fibers. The branch optical fibers have first branch cut ends at positions adjacent to each of the star couplers and second branch cut ends at positions adjacent to the remote station groups. The first branch cut ends are connected to the second ports of the star couplers and the second branch cut ends to the remote stations of a remote station group.

2 Claims, 16 Drawing Sheets

OTHER PUBLICATIONS

Yutaka Fuke, et al., "RF Sub-Carrier Optical Transmissions Using A Bus Type Topology for Personal Digital Cellular Systems", Technical Digest—MWP '99—International Topical Meeting on Microwave Photonics, Nov. 17-19, 1999, pp. 209-212.

Hisao Oikawa, et al., "Function Allocation in FTTH Access Network", NTT R&D, vol. 41, No. 7, 1992, pp. 821-828.

T. Ohtsuka, et al., Journal of Lightwave Technology, vol. 6, No. 11, XP-000118386, pp. 1728-1736, "Digital Optical CATV System Using Hubbed Distribution Architecture", Nov. 1988.

* cited by examiner

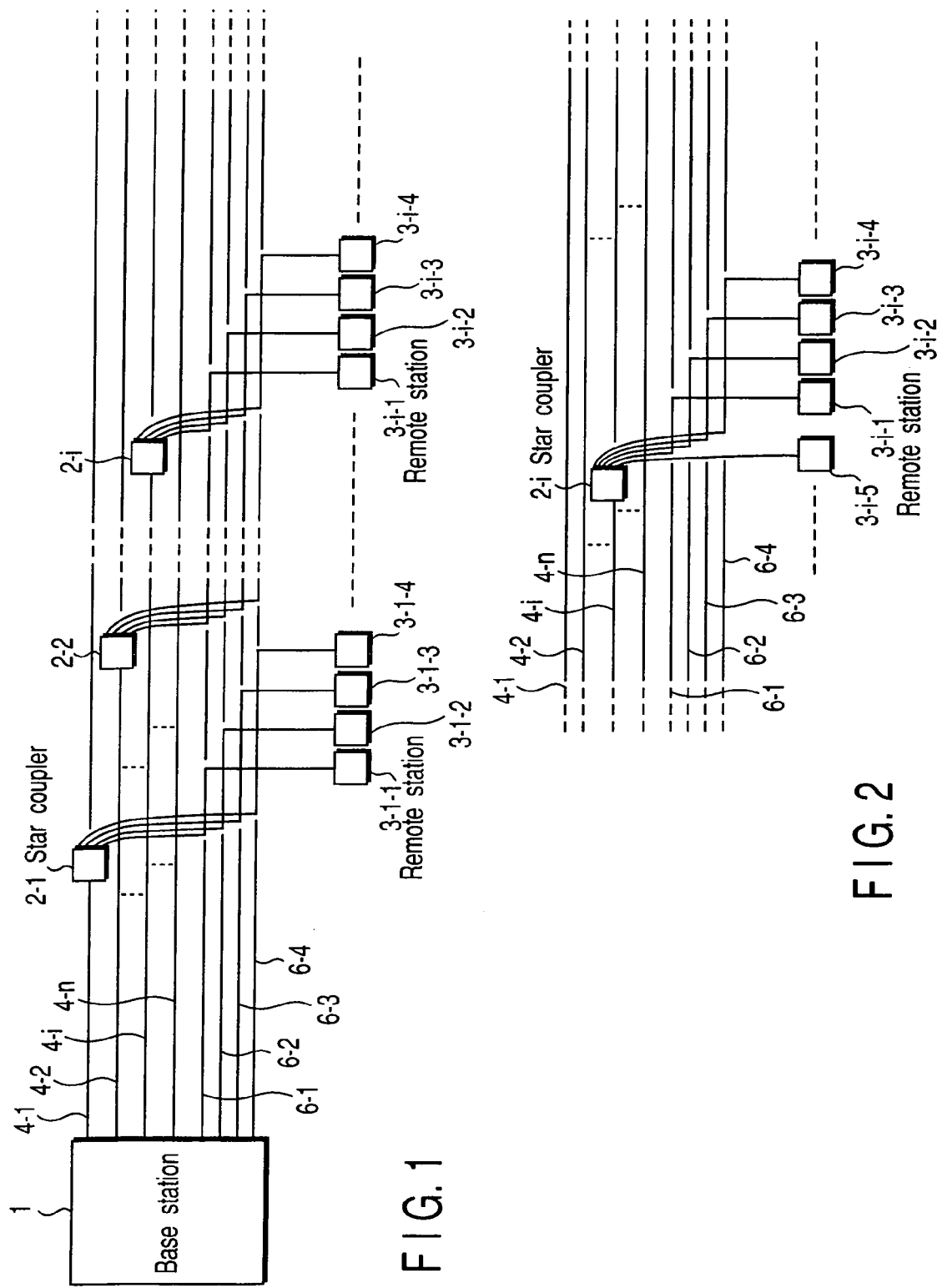

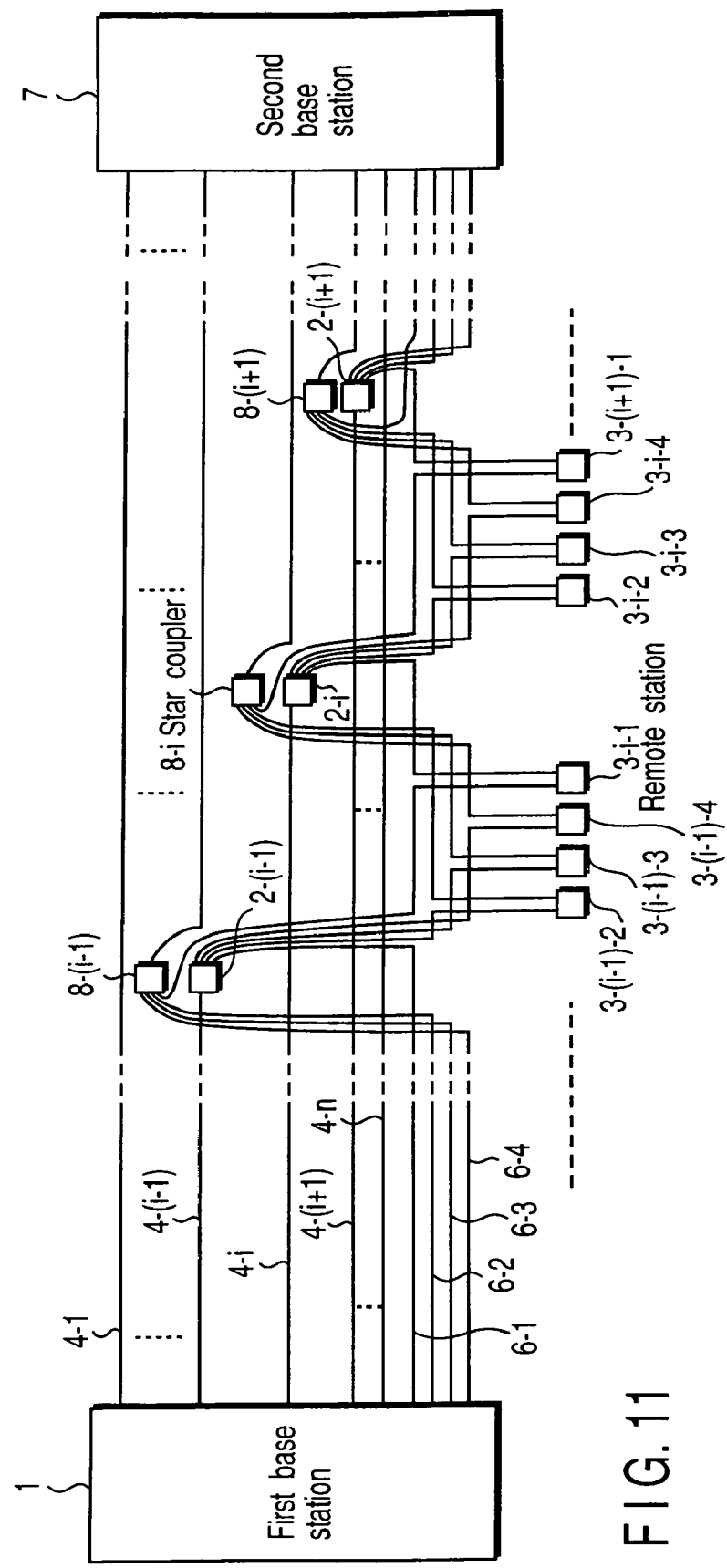
F I G. 11

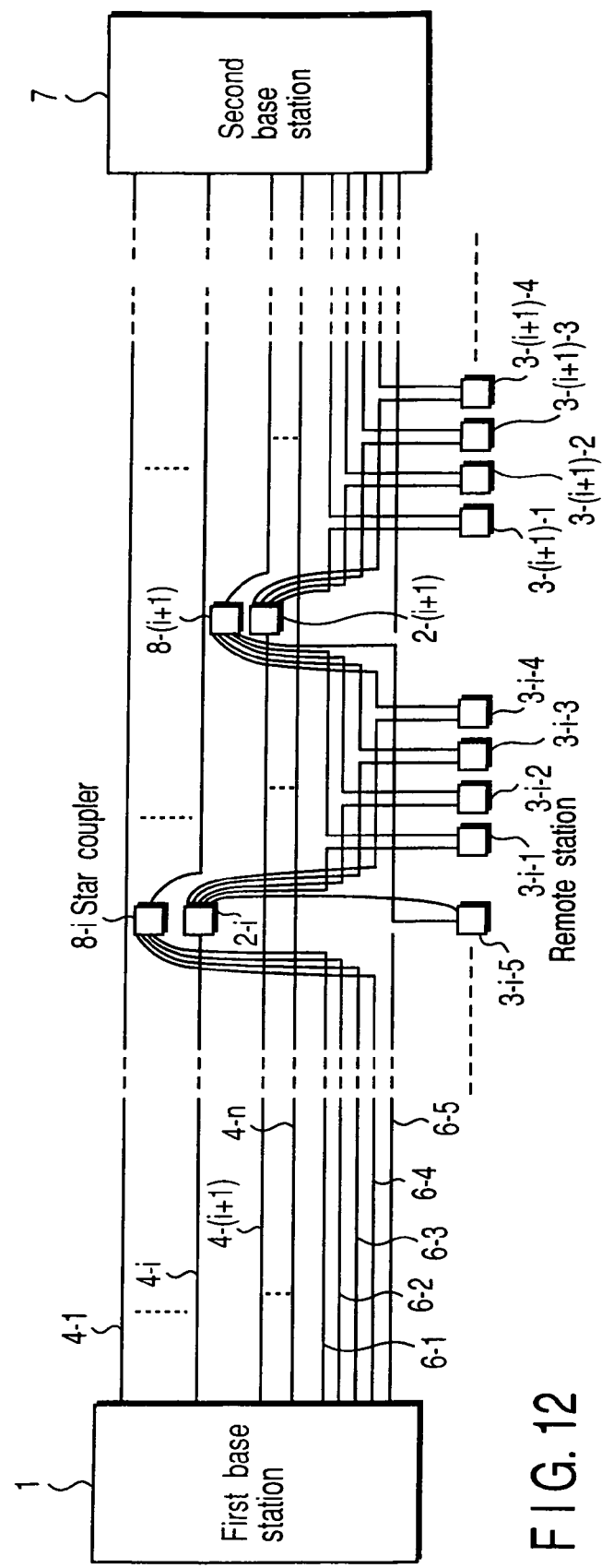
F I G. 12

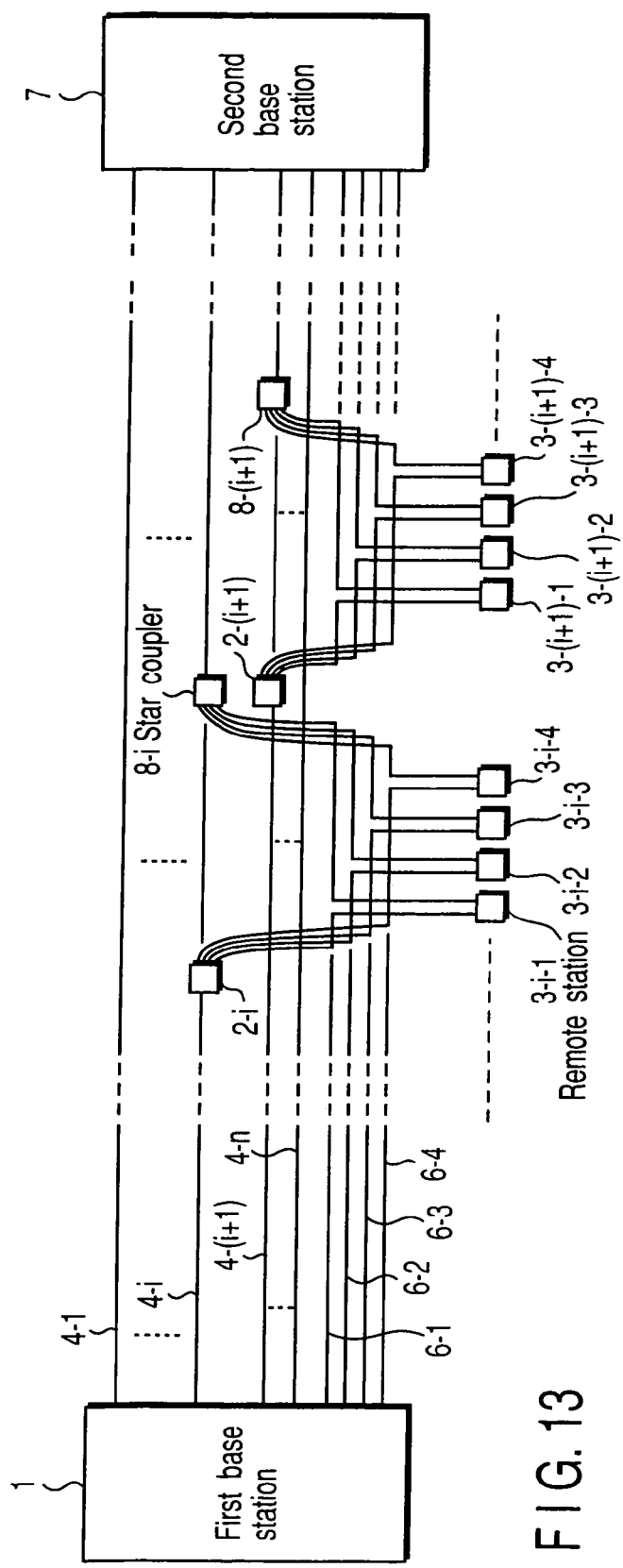
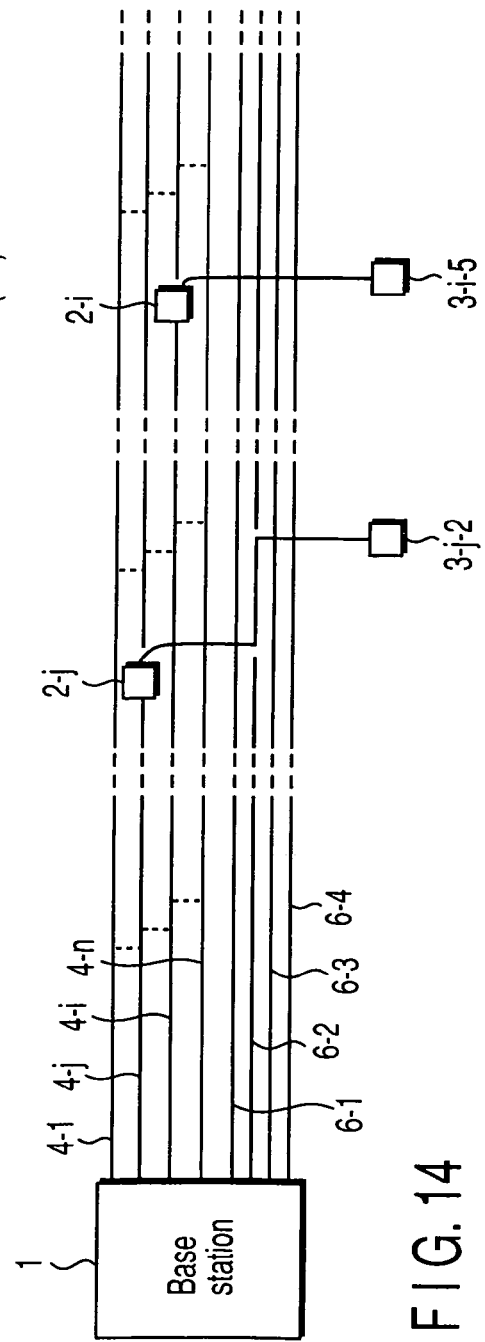
FIG. 13
FIG. 14

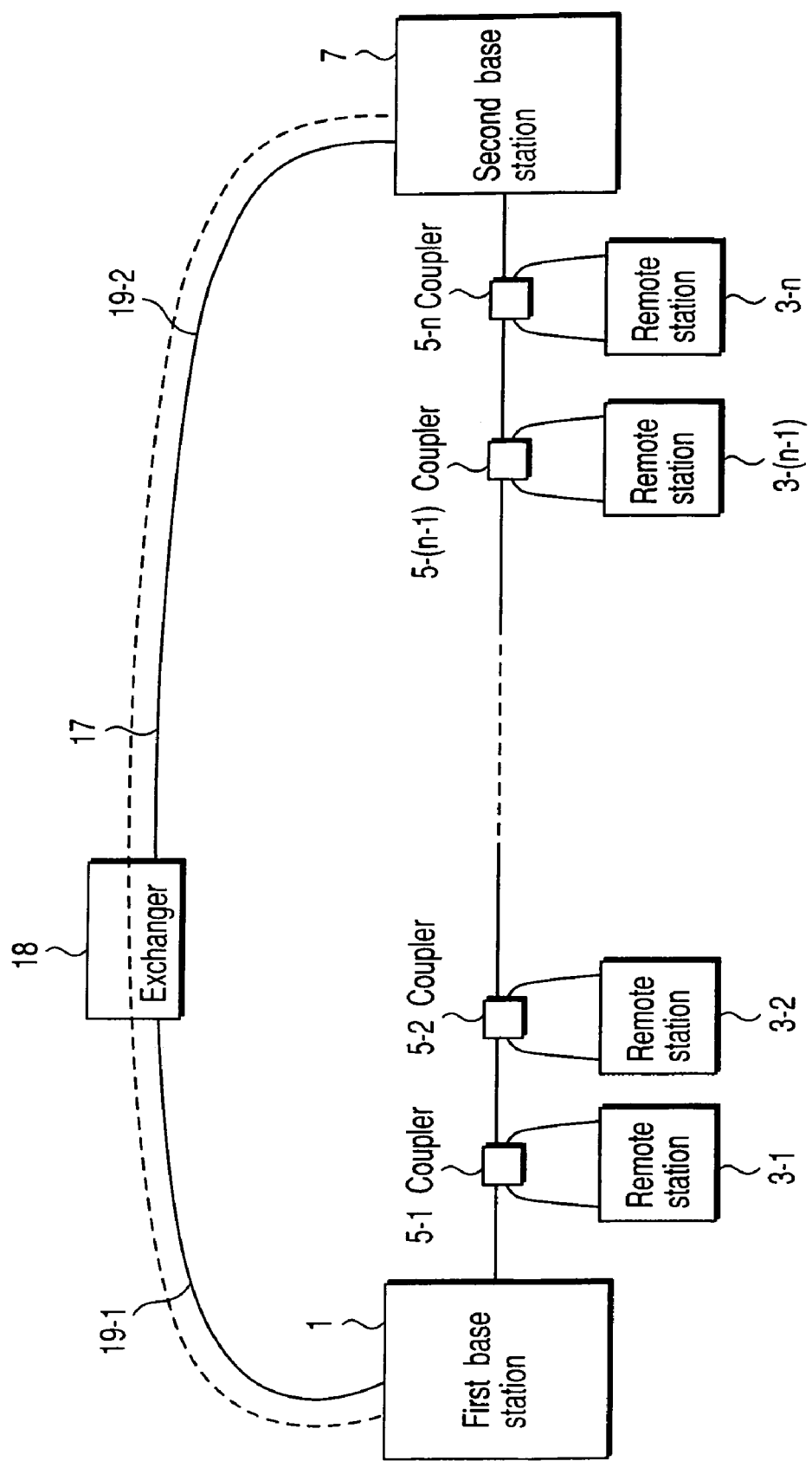
F I G. 22

OPTICAL COMMUNICATIONS SYSTEM

CROSS-REFERENCE TO RELATED APPLICATIONS

This application is a Divisional of U.S. patent application Ser. No. 09/950,652, filed Sep. 13, 2001 now U.S. Pat. No. 7,046,933, and is based upon and claims the benefit of priority from the prior Japanese Patent Application No. 2000-300440, filed Sep. 29, 2000. The entire contents of these applications are incorporated herein by reference.

BACKGROUND OF THE INVENTION

1. Field of the Invention

The present invention relates to an optical communications system for communications between a base station and remote stations.

2. Description of the Related Art

Among the network architectures for optical communications systems is a passive optical network (PON) architecture, in which a base station supports a plurality of remote stations and, it is applied when the communication capacity of each remote station is not too large, to inserting an optical divider/coupler in an optical fiber connected to the base station for accommodating two or more remote stations. The PON architecture is broadly classified into two types: bus networks and star networks.

With the bus networks, downstream optical signals sent over a trunk optical fiber are branched in couplers for distribution to remote stations. Each upstream optical signal output from each remote station is combined in each coupler with the trunk optical filter for transmission to the base station.

With the star networks, optical signals from the base station are distributed through an intermediate star coupler to remote stations. Optical signals from the remote stations are combined in the star coupler and then sent to the base station.

As described above, the bus networks are suitable for a situation in which each of the remote stations is arranged in a line along the trunk fiber. In some instances, it is desired to allow a single trunk optical fiber to accommodate more remote stations than the bus networks. In that case, one might suggest connecting a star coupler to the trunk optical fiber; however, this approach would require installation of new optical fibers for connecting the remote stations to the star coupler, thus resulting in failure to make good use of the advantage that the remote stations are arranged along the trunk optical fiber.

BRIEF SUMMARY OF THE INVENTION

It is an object of the present invention to allow a large number of remote stations that are placed suitable with a bus configuration to be connected in a star configuration in an efficient manner.

According to a first aspect of the present invention, there is provided An optical communication system comprising a base station, a plurality of trunk optical fibers connected to the base station and laid on a route, a plurality of star couplers each including a first port connected to one of trunk cut ends formed by cutting at least some of the trunk optical fibers and a plurality of second ports opposite to the first port, a plurality of remote stations arranged along the route and divided into a plurality of remote station groups, and a plurality of branch optical fibers laid on the route, the branch optical fibers being cut at positions adjacent to each of the star couplers to form first branch cut ends and at positions adjacent to the remote station groups to form second branch cut ends, the first branch cut ends being connected to the second ports of the star couplers, and the second branch cut ends being connected to the remote stations of one of the remote station groups.

According to a second aspect of the present invention, there is provided An optical communication system comprising first and second base stations, at least one trunk optical fiber connected between the first and second base stations, a plurality of couplers inserted in serial in the trunk optical fiber, a plurality of remote stations connected to the couplers to receive downstream signals from any of the first and second base stations and to send upstream signals to any of the first and second base stations, and a communication line connected between the first and second base stations to form a different route from the trunk optical fiber.

BRIEF DESCRIPTION OF THE SEVERAL VIEWS OF THE DRAWING

FIG. 1 shows an optical communications system according to a first embodiment of a first aspect of the present invention;

FIG. 2 shows partially an optical communications system according to a second embodiment of the first aspect of the present invention;

FIG. 11 shows a second modification of the fifth embodiment of the first aspect of the present invention;

FIG. 12 shows a third modification of the fifth embodiment of the first aspect of the present invention;

FIG. 13 shows an optical communications system according to a fourth aspect of the present invention;

FIG. 14 shows an optical communications system according to a developing form of the present invention;

FIG. 22 shows an optical communications system according to a second embodiment of the fifth aspect of the present invention;

DETAILED DESCRIPTION OF THE INVENTION

FIG. 1 shows a first embodiment in a first aspect of the present invention. To a base station (master station) 1 are connected trunk optical fibers 4-1, 4-2, ..., 4-n (collectively referred to as trunk optical fibers 4), which are laid along the same path or route. For example, the optical fibers 4 form a multi fiber cable. Branch optical fibers 6-1 to 6-4 (collectively referred to as branch optical fibers 6) are built parallel to the trunk optical fibers 4. The branch optical fibers 6 may be fibers in a multi fiber cable as with the trunk optical fibers 4 or in a multi fiber cable laid parallel to the trunk optical fibers. That is, the trunk optical fibers 4 and the branch optical fibers 6 are laid along the same path of installation.

FIG. 1 shows a configuration in which a single trunk optical fiber can accommodate up to four remote stations. Each trunk optical fiber is cut in its intermediate portion and connected there with a corresponding star coupler 2-x (x=1, 2, ..., n). The star coupler is, for example, a 1×4 star coupler, which has its one first port connected to the corresponding trunk optical fiber 4-x and its four second ports connected to the four branch optical fibers 6-1 to 6-4. In this case, the four branch optical fibers are cut in the vicinity of a star coupler and connected there to the four second ports of that star coupler. In the vicinity of the path of installation of the multi fiber cable are placed a large number of remote stations (slave stations). For example, remote stations 3-i-1 to 3-i-4 connected to a star coupler 2-i form a theoretical group of remote stations. The branch optical fibers are cut in the vicinity of the remote stations 3-i-1 to 3-i-4 and connected there to the remote stations. Thus, an optical path from each remote station through the corresponding branch fiber, star coupler and trunk fiber to the base station is set up.

The above configuration allows remote stations arranged in a configuration suitable for a bus network to be rearranged in a star network configuration to increase the number of branches. In addition, unlike the conventional star configuration, there is no need of installation of new fibers from a star coupler to remote stations. Moreover, all the groups of remote stations share the branch optical fibers, providing higher fiber utilization.

Figure 4:
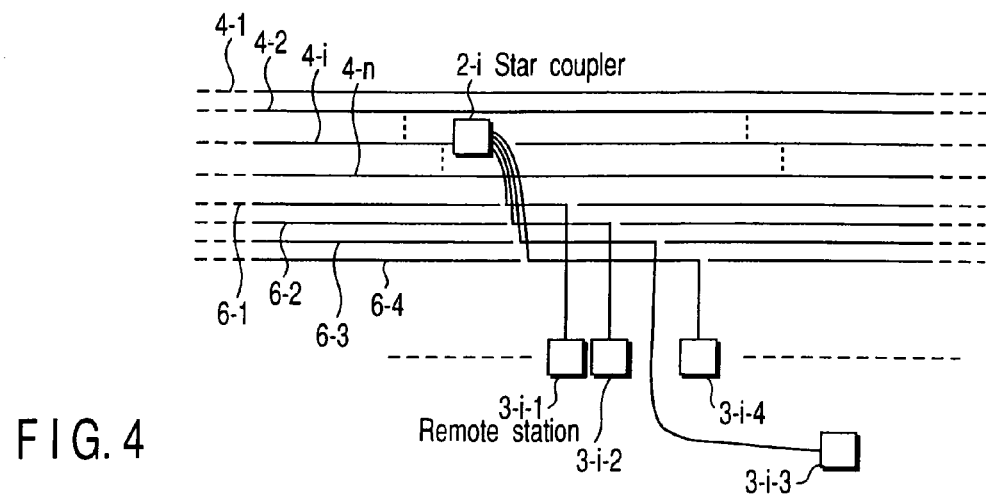
FIG. 4 shows an optical communications system according to a modification of the first embodiment of the first aspect of the present invention.

In FIG. 1, lines for connection between the star couplers and the branch optical fibers and lines for connection between the branch optical fibers and the remote stations are illustrated. However, in practice, they are pigtail fibers of star couplers and remote stations or short fiber patch cords. The present embodiment supposes that the remote stations are arranged in the vicinity of the same line. A configuration that needs the installation of long lead-in lines as require to be buried from remote stations to branch fibers involves difficulties in making the most use of the features of the present invention. In practice, however, there is the possibility that such a situation arises. The present invention is effective if remote stations that require long lead-in lines are sufficiently smaller in number the remote stations that need no long lead-in line. For example, in FIG. 4, the remote station 3-i-3 is connected to the branch fiber 6-3 by a slightly longer lead-in line than with the other remote stations 3-i-i, 3-i-2, and 3-i-4.

The number of remote stations needs not to be the same for all the remote station groups. Although, in FIG. 1, each group contains four remote stations, all the star couplers need not accommodate four remote stations and some star couplers may accommodate three, two, or one remote station. In the case of one remote station, the trunk fiber may be connected to the remote station without any star coupler if future extension is not considered. If a remote station is placed in close vicinity of a star coupler, it may be directly coupled to the star coupler without a branch optical fiber as in a second embodiment of the first aspect shown in FIG. 2. To the trunk optical fiber 4-i is coupled the star coupler 2-i, which is in turn coupled to the remote stations 3-i-1 to 3-i-4 by the cut branch optical fibers 6-1 to 6-4. In contrast, the remote station 3-i-5, placed in close vicinity of the star coupler 2-i, is coupled with that star coupler without any branch fiber. The configuration as shown in FIG. 2 allows the number of remote stations in one group to be made larger than the number of branch optical fibers.

Figure 3:
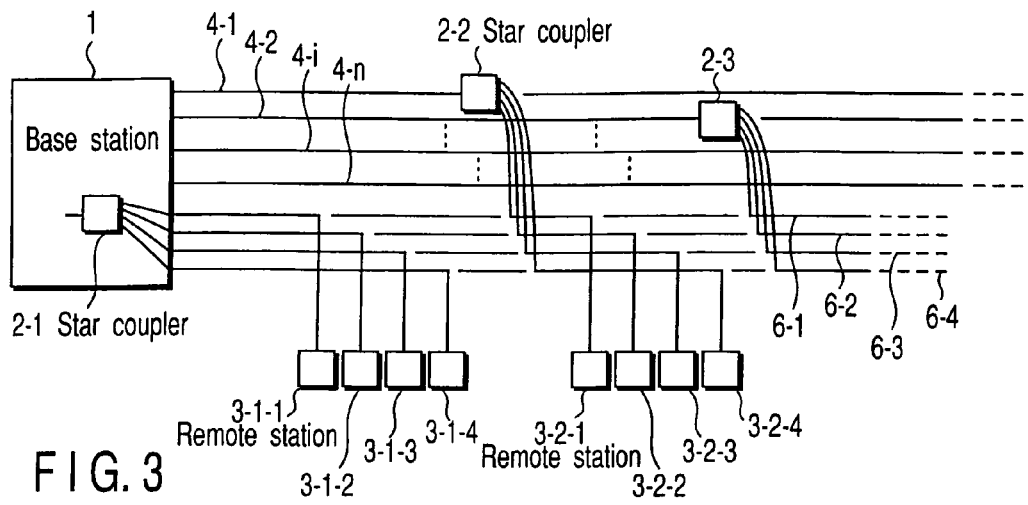
FIG. 3 shows an optical communications system according to a third embodiment of the first aspect of the present invention.

FIG. 3 illustrates a third embodiment of the first aspect in which a star coupler 2-1 for the remote station group closest to the base station is installed in the base station and connected to the branch optical fibers. In this example, the optical transmitter or the optical receiver in the base station is connected to the star coupler not by trunk optical fibers but by patch cords. However, it goes without saying that the star coupler for the closest remote station group to the base station may be installed outside the base station, in which case the star coupler is connected to a trunk optical fiber as shown in FIG. 1.

A first embodiment of a second aspect will be described hereinafter with reference to FIG. 5. The 1×4 star coupler 2-i connected to the trunk fiber 4-i has its four second ports connected to the cut ends of the branch optical fibers 6-1 to 6-3. Of the four second ports of the star coupler, the first one is connected to the branch fiber 6-1, the second one is connected to the branch fiber 6-2, and the remaining two are connected to the branch fiber 6-3. Of the four remote stations, the remote station 3-i-1 is placed closer to the base station 1 than is the star coupler 2-i and the other remote stations 3-i-2 to 3-i-4 are placed farther away from the base station than is the star coupler. The remote stations 3-i-2 to 3-i-4 are connected in the same manner as in FIG. 1. As for the remote station 3-i-1, of the cut ends of the branch optical fiber 6-3 in the vicinity of the star coupler 2-i, the cut end that is not connected to the remote station 3-i-2 is connected to the star coupler 2-i, and the branch optical fiber 6-3 that extends therefrom toward the base station is cut in the vicinity of the remote station 3-i-1 for connection thereof.

The branch optical fiber portion used to connect the remote station 3-i-1 is the remainder of the branch optical fiber 6-3 used to connect one of the remote stations which are accommodated by the star coupler 2-(i−1) that is closer to the base station than is the star coupler 2-i in the configuration of FIG. 1. That is, that branch optical fiber portion is an unused portion in the configuration of FIG. 1. Thus, the effective use of an unused portion of a branch optical fiber allows the number of branch optical fibers to be reduced.

Figure 6:
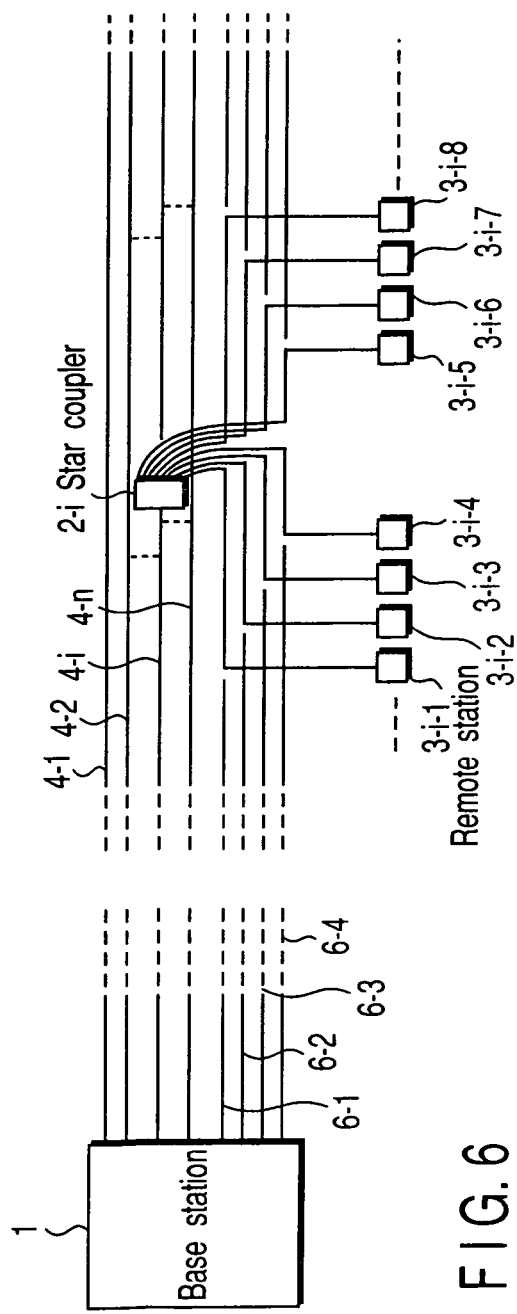
FIG. 6 shows an optical communications system according to a second embodiment of the second aspect of the present invention.

FIG. 6 shows a second embodiment of the second aspect which allows remote stations to be accommodated in the most efficient manner. In this example, the number of remote stations in one group is eight. The trunk optical fiber 4-i is connected to a 1×8 star coupler 2-i having its eight second ports connected to branch optical fibers. The branch optical fibers 6-1 to 6-4 are cut in the vicinity of the star coupler 2-i and the eight cut ends of the four branch optical fibers are connected to the eight second ports of the star coupler 2-i. The remote station 3-i-1 is connected to that portion of the branch optical fiber 6-1 which is close to the base station and the remote station 3-i-8 is connected to that portion of the branch optical fiber 6-1 which is far away from the base station. The other remote stations are also connected to the corresponding branch optical fibers in the same manner as with the remote stations 3-i-1 and 3-i-8. In the example of FIG. 6, four branch optical fibers are used for eight remote stations. In order to connect eight remote stations, the configuration of FIG. 1 will require eight branch optical fibers. In contrast, the configuration of FIG. 8 allows the number of branch optical fibers to be halved, providing higher fiber utilization. If the number of remote stations in the same group which are to be connected to branch optical fibers is 2n+1, (n+1) branch optical fibers will be required, in which case the number of remote stations to the right or left of the star coupler is set larger by one than that to the left or right.

Figure 7:
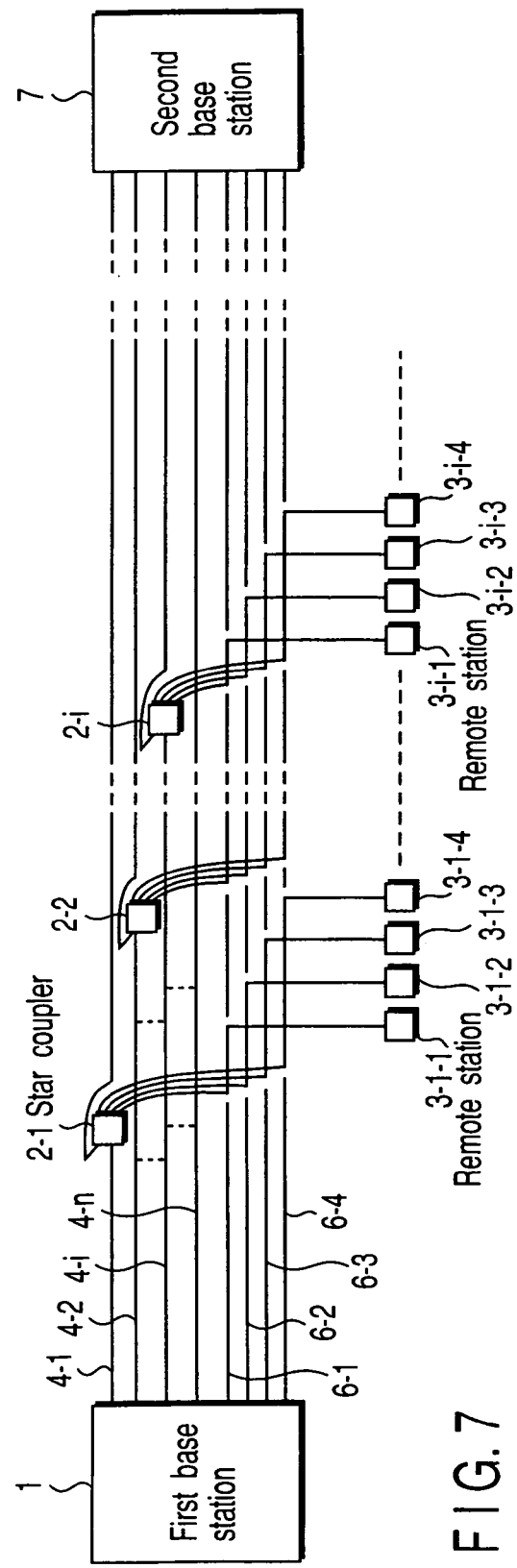
FIG. 7 shows an optical communications system according to a first embodiment of a third aspect of the present invention.

Next, a first embodiment of a third aspect will be described. FIG. 7 shows a structure based on the third aspect to the configuration of FIG. 1. To the first base station are connected trunk optical fibers in the form of a cable, which are laid to a second base station 7. The description below is given in terms of a trunk optical fiber 4-i.

The trunk optical fiber 4-i is cut halfway and connected there to the star coupler 2-i. The number of remote stations connected to the star coupler is four. The star coupler is of a 2×4 type. The two cut ends of the trunk optical fiber 4-i are coupled to the two first ports of the star coupler, and the four second ports of the star coupler are connected to the branch optical fibers 6-1 to 6-4, respectively. With such a configuration, if the trunk optical fiber 4-i extending from the first base station to the star coupler 2-i is broken or the optical transmitter or receiver connected to the fiber 4-i in the first base station fails, communications can be made via the second base station 7. In the event of such a failure, the second base station is simply notified over control lines of the effect that communications between the first base station and the i-th remote station group are disabled and it is required to switch communications from via the first base station to via the second base station.

When stopping of communication with the first base station is detected on the side of remote stations, it is required that the second base station be notified over control lines. To allow for breaking of the optical fiber cable, it is advisable to lay the control lines connecting the two base stations together in a different path from the optical fiber cable containing the trunk optical fibers.

The optical couplers little vary in loss and cost between 2×n and 1×n. Thus, an increase in cost resulting from changing the type of coupler from 1×n to 2×n is very small. That portion of the trunk optical fiber 4-i which extends from the optical coupler 2-i to the second base station is left unused in the configuration of FIG. 1. In implementing the path for failure protection, therefore, the third aspect of the invention saves the need to build a new optical fiber cable for connection of the star coupler 2-i to the second base station. According to the third aspect, therefore, the path for failure protection can be implemented at low cost and with ease.

Figure 5:
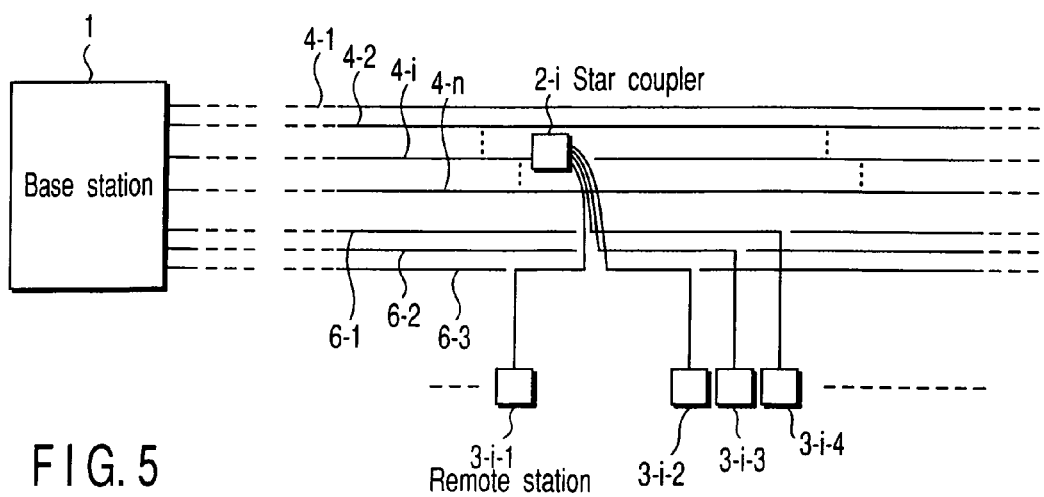
FIG. 5 shows an optical communications system according to a first embodiment of a second aspect of the present invention.
Figure 8:
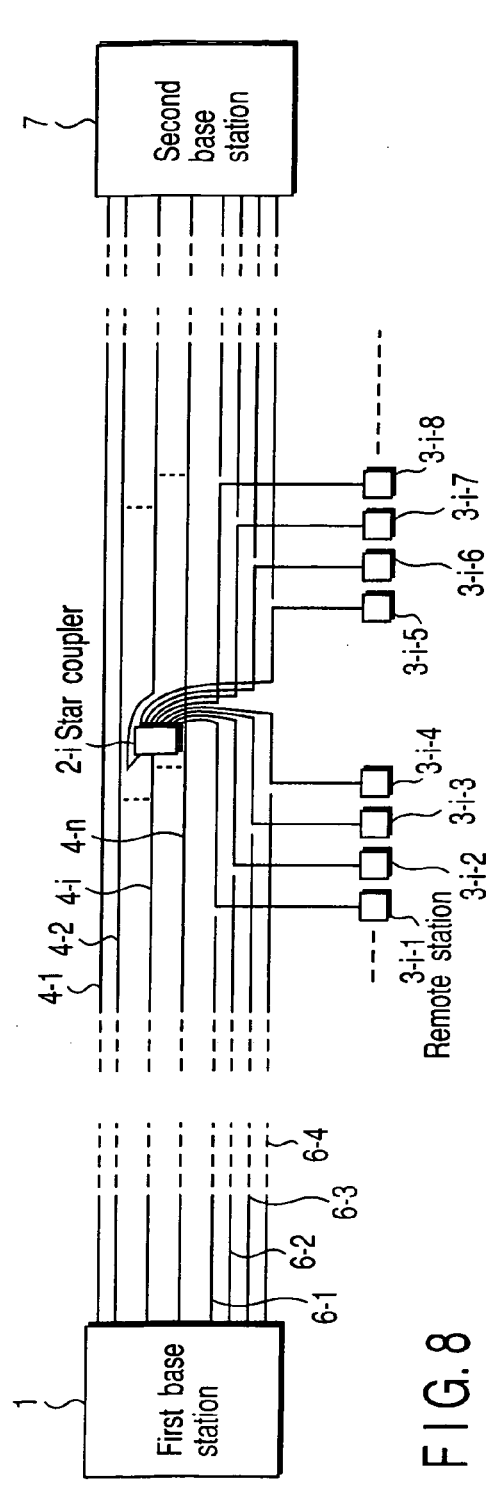
FIG. 8 shows an optical communications system according to a second embodiment of the third aspect of the present invention.

The third aspect can be applied not only to the configuration of FIG. 1 but also to the configurations of FIGS. 5 and 6. FIG. 8 shows a second embodiment of the third aspect in which the third aspect is applied to the configuration of FIG. 6. In the configuration of FIG. 8, the star coupler 2-i is replaced by a 2×8 coupler and one of the two first ports is connected to the second base station 7 by the unused portion of the trunk optical fiber 4-i, forming a failure protection configuration.

Figure 9:
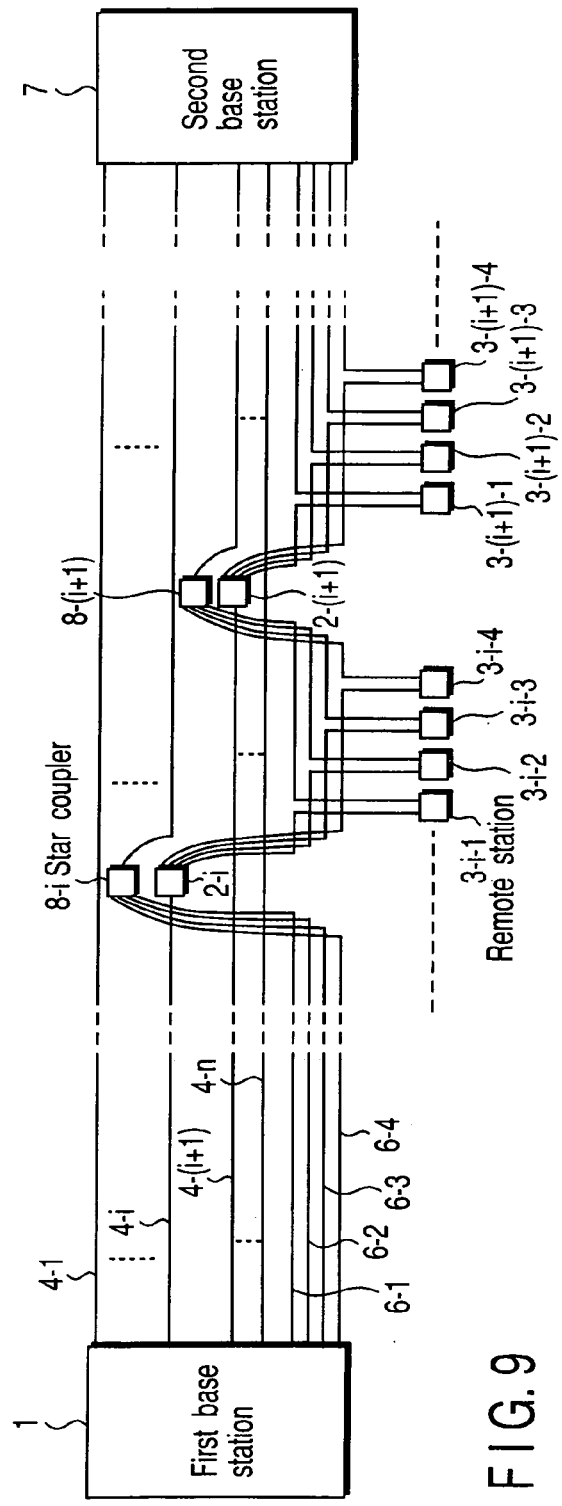
FIG. 9 shows an optical communications system according to a fifth embodiment of the first aspect of the present invention.

FIG. 9 shows a fifth embodiment of the first aspect which is directed to the failure protection configuration of the first aspect. The aforementioned third aspect has a failure protection configuration with respect to the base station, trunk optical fibers and the star couplers. In contrast, in the configuration of FIG. 9, even the remote station has a failure protection configuration including two ports. The trunk fiber 4-i connected to the first base station is cut halfway and connected there to the 1×4 star coupler 2-i. The number of remote stations connected to the star coupler 2-i is four. The four second ports of the star coupler are connected by the branch optical fibers 6-1 to 6-4 to the remote stations 3-i-1 to 3-i-4, respectively.

The trunk optical fiber 4-(i+1) is likewise connected to the first base station 1 and to the 1×4 star coupler 2-(i+1) for connection to the adjacent remote station group. The branch fibers 6-1 to 6-4 are cut in the vicinity of the star coupler 2-(i+1) for connection to the four second ports of the star coupler 2-(i+1) and to the remote stations 3-(i+1)-1 to 3-(i+1)-4. The branch optical fibers 6-1 to 6-4 are cut in the vicinity of the star coupler 2-(i+1) and each have two cut ends. In the configuration of FIG. 1, the first cut ends of the branch optical fibers which are farther away from the first base station 1 are used to connect the remote stations 3-(i+1)-1 to 3-(i+1)-4 and the second cut ends which are closer to the base station 1 are left unused. In the configuration of FIG. 9, the unused cut ends of the branch optical fibers are used for failure protection configuration of the remote stations 3-i-1 to 3-i-4.

The remaining cut end of the trunk optical fiber 4-(i+1) having its one cut end connected to the star coupler 2-(i+1) is connected to a 1×4 star coupler 8-(i+1). The end of the trunk optical fiber 4-(i+1) connected to the one first port of the star coupler 8-(i+1) connects to the second base station 7.

Of the eight cut ends of the branch optical fibers 6-1 to 6-4 in the vicinity of the star coupler 2-(i+1), the four cut ends that are not connected to that star coupler are connected to the four second ports of the star coupler 8-(i+1). The other ends of the branch optical fibers 6-1 to 6-4 connect to the cut ends thereof for connection to the remote stations 3-i-1 to 3-i-4. In the configuration of FIG. 1, those cut ends are left unused.

In the failure protection configuration of FIG. 9, each remote station has two ports: one for communication with the first base station 1 and one for communication with the second base station 7. As for the remote stations 3-i-1 to 3-i-4, the unused cut ends of the branch optical fibers 6-1 to 6-4 are connected to the second ports of remote stations.

Thus, the communication paths between the second base station 7 and the remote stations 3-i-1 to 3-i-4 are reserved. In the configuration of FIG. 9, since those portions of the trunk and branch optical fibers which are left unused in the configuration of the first aspect of the invention are used as paths for failure protection configuration, there is no need of installing fibers anew. The need to install second-system star couplers results in some increase in cost in comparison with the configuration of the third aspect. However, since the path for connection to the first base station and the path for connection to the second base station do not overlap, even if a breakdown occurs in an optical fiber cable that contains both trunk and branch optical fibers, communications will be reserved without fail.

Figure 10:
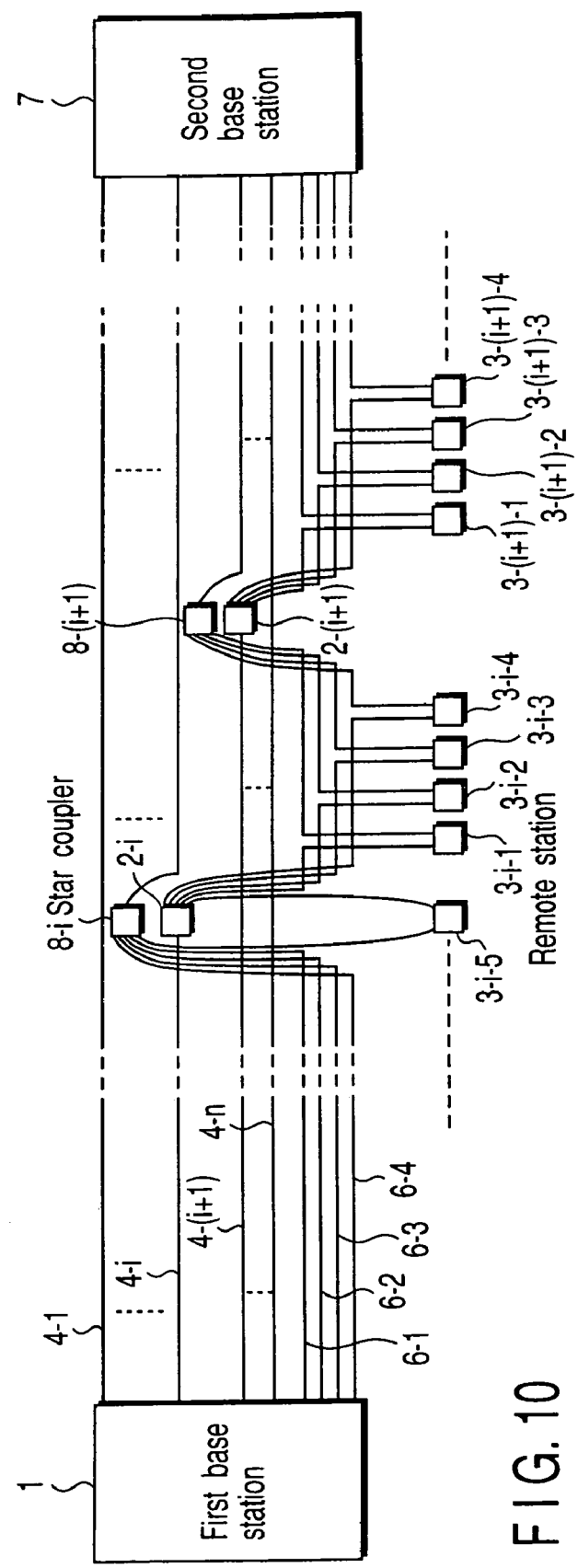
FIG. 10 shows a first modification of the fifth embodiment of the first aspect of the present invention.

A modification of the configuration of FIG. 9 is illustrated in FIG. 10. As illustrated in FIG. 2, when a remote station is located very close to a star coupler, it can be directly connected to the star coupler without any branch optical fiber. The configurations through the third aspect offer no problem in adding such a remote station. However, some new idea is necessary in adding such a remote station to the failure protection configuration as shown in FIG. 9.

FIG. 10 shows an optical communication system which is a first modification of the fifth embodiment of the first aspect. In FIG. 10, the trunk optical fiber 4-i connected to the first base station 1 is cut halfway and connected there to a 1×5 star coupler 2-i, which can accommodate five remote stations. One of the five remote stations is connected to the star coupler without any branch optical fiber. The remaining four ports of the star coupler 2-i are connected to remote stations 3-i-1 to 3-i-4 by branch optical fibers 6-1 to 6-4. The other cut end of the trunk optical fiber 4-i, which connects to the second base station 7, is connected to the second-system star coupler 8-i, which is also a 1×5 star coupler and used for failure protection configuration of remote stations 3-(i−1)-1 to 3-(i−1)-4 not shown. The remote stations 3-(i−1)-1 to 3-(i−1)-4 form a group adjacent to the group of remote stations 3-i-1 to 3-i-4. The star coupler 8-i has its four second ports connected to the branch optical fibers as in FIG. 9 and its remaining one second port connected to the second-system port of the remote station 3-i-5. Thus, the star coupler 8-i is connected across two groups of remote stations.

If the number of branch optical fibers can be increased for failure protection configuration, such a configuration similar to the configuration of FIG. 9 as shown in FIG. 12 can be taken. In this case, one star coupler will not be connected across different groups of remote stations.

In FIG. 12, the trunk optical fiber 4-i connected to the first base station 1 is cut halfway and connected there to the 1×5 star coupler 2-i. The star coupler 2-i has its four second ports connected by the branch optical fibers 6-1 to 6-4 to the remote stations 3-i-1 to 3-i-4 and its remaining one second port directly connected to the remote station 3-i-5.

The remaining portion of the trunk optical fiber 4-(i+1) connected to the second base station 7 has its cut end connected to the first port of a 1×5 star coupler 8-(i+1), which has its five second ports connected to the branch optical fibers 6-1 to 6-5. The branch optical fibers 6-1 to 6-4 have their cut ends close to the remote stations 3-i-1 to 3-i-4 connected to the second-system ports of the respective remote stations 3-i-1 to 3-i-4. The branch optical fiber 6-5 is cut in the vicinity of the star coupler 2-i, i.e., in the vicinity of the remote station 3-i-5, and connected there to the second-system port of the remote station 3-i-5.

In such a configuration, the branch optical fiber 6-5 is used only for failure protection configuration, i.e., for connection of the remote station 3-i-5 to the second base station 7, not to the first base station 1. In the configuration of FIG. 10, a failure protection configuration is allowed without increasing the branch optical fibers, however, one star coupler is connected across different groups of remote stations. In other words, the remote station configuration for the first base station 1 differs from that for the second base station 7. In the configuration of FIG. 12, the remote station grouping does not differ with respect to the first base station 1 and the second base station 7, but the branch optical fibers have to be increased. Since the configurations of FIGS. 10 and 12 differ in their merit, it is recommended that a choice be made to suit other system requirements.

FIG. 11 shows a second modification of the fifth embodiment of the first aspect which implements such a failure protection configuration as shown in FIG. 9 when the remote stations in the same group are located on opposite sides of the star coupler to which they are connected. There are two groups of remote stations that are adjacent to a certain remote station group: one near to a base station and one far from the base station. In such a configuration of FIG. 11, paths for failure protection configuration are obtained from both of them.

In FIG. 11, the trunk optical fiber 4-i connected to the first base station 1 is cut halfway and connected there to a 1×4 star coupler 2-i, which can accommodate four remote stations. The number of branch optical fibers is four. Only one of the four second ports of the star coupler 2-i is connected through the branch optical fiber 6-1 to the remote station 3-i-1 nearer to the first base station 1 than the star coupler 2-i. Connections for failure protection configuration in such a case are made as follows:

The cut end of the trunk optical fiber 4-i on the side of the second base station 7 is connected to the second-system star coupler 8-i, which is of a 1×4 type.

Three of the four second ports of the star coupler are connected to the second-system ports of remote stations 3-(i−1)-2, 3-(i−1)-3 and 3-(i−1)-4 in the adjacent group which are connected to the branch optical fibers 6-2, 6-3 and 6-4. The remaining one of the four second ports is connected to one of the cut ends of the branch optical fiber 6-1 which is farther from the first base station 1 and then connected to the second-system port of the remote station 3-(i+1)-1 in the adjacent group located farther away from the first base station.

The cut end of the trunk optical fiber 4-(i−1) on the side of the second base station 7 is connected to the first port of a second-system 1×4 star coupler 8-(i−1). One of the four first ports of the star coupler 8-(i−1) is connected to the cut end of the branch optical fiber 6-1 which is farther from the first base station 1 and then connected to the second-system port of the remote station 3-i-1.

Three of the four second ports of a second-system 1×4 star coupler 8-(i+1) connected to the cut end of the trunk optical fiber 4-(i+1) on the side of the second base station 7 are connected to the cut ends of the branch optical fibers 6-2, 6-3 and 6-4 on the side of the first base station 1 and then connected to the second-system ports of the remote stations 3-i-2, 3-i-3 and 3-i-4. Thus, the dual-configuration paths for the group of the remote stations 3-i-1 to 3-i-4 are obtained through the star couplers 8-(i−1) and 8-(i+1).

FIG. 13 shows a failure protection configuration of a fourth aspect. In the configurations of FIGS. 9 to 12, the failure protection configuration is implemented through the use of adjacent trunk optical fibers. In contrast, in FIG. 13, the failure protection configuration is implemented by the use of only one trunk optical fiber.

The trunk optical fiber 4-i connected to the first base station 1 is cut halfway and connected there to the 1×4 star coupler 2-i which has its four second ports connected to the branch optical fibers 6-1 to 6-4. Those branch optical fibers are cut in the vicinity of the remote stations 3-i-1 to 3-i-4 for connection thereto. The branch optical fibers 6-1 to 6-4 are cut in the vicinity of the star coupler 2-(i+1) connected to the trunk optical fiber 4-(i+1) for connection to the adjacent group of remote stations and connected there to the star coupler 2-(i+1). The trunk optical fiber 4-i is cut again in the vicinity of the star coupler 2-(i+1) and the cut end of the portion of the trunk optical fiber 4-i connected to the second base station 7 is connected to the second-system 1×4 star coupler 8-i.

The four second ports of the star coupler 8-i are connected to those cut ends of the branch optical fibers 6-1 to 6-4 which are opposite to the cut ends thereof for connection to the star coupler 2-(i+1) and then connected to the second-system ports of the respective remote stations 3-i-1 to 3-i-4. The same applies to groups of remote stations which are connected to the other trunk optical fibers. Note that, in such a configuration as shown in FIG. 3 in which a star coupler is installed within the first base station 1, a new trunk optical fiber will be needed for failure protection configuration of the remote station group nearest to the first base station.

In the configuration of the fourth aspect in which each trunk optical fiber is cut at two points, the portion of that trunk optical fiber between the two points, i.e., between the star coupler connected to the first base station 1 and the star coupler connected to the second base station 2, is left unused. Though having this minor defect, the configuration of the fourth aspect provides excellent extensibility because the failure protection configuration of one group of remote stations can be implemented through the use of one trunk optical fiber.

Although, in FIG. 13, the second-system star coupler 8-i is inserted in the position of the star coupler 2-(i+1), it may be provided in any position between the remote station 3-i-4 and the star coupler 2-(i+1). If, however, the star coupler 8-i is inserted in other than the position of the star coupler 2-(i+1), the branch optical fiber must be cut anew in that position.

In general, when a communications system is installed, it is seldom that all the remote stations are installed from the beginning. In many cases, at first some remote stations are installed at long intervals and then a remote station or remote stations are installed between existing remote stations with time, and only in required positions. With this inventive configurations as well, it is difficult to suppose that, from the beginning, star couplers are connected to all trunk optical fibers and all remote stations are connected to all the star couplers. Then, developing forms of an optical communications system from the time of installation thereof will be described.

FIG. 14 shows an optical communications system which is initially installed supposing the final configuration in which all the remote stations are installed. Positions where all the star couplers will be inserted are determined in advance. As for a remote station to be installed anew, a star coupler and a trunk optical fiber to which that remote station is expected to be connected are determined from the position of the remote station. If a star coupler has been already installed for the trunk optical fiber, the new remote station is connected to the star coupler already installed through a branch optical fiber as required. If no star coupler has been installed, a new star coupler should be installed for connection to the newly installed remote station through a branch optical fiber.

For example, suppose that, in FIG. 14, a remote station 3-j-2 is to be installed anew. In this case, the trunk optical fiber to which the remote station 3-j-2 is to be connected is 4-j. If no star coupler to be connected to the trunk optical fiber 4-j has been installed, then a star coupler 2-j is installed. The remote station 3-j-2 is connected to the star coupler 2-j through the branch optical fiber 6-2. If a remote station 3-i-5 is to be installed anew, the trunk optical fiber to which the remote station 3-i-5 is to be connected is 4-i. If no star coupler to be connected to the trunk optical fiber 4-i has been installed, then a star coupler 2-i is installed. If the position of the remote station 3-i-5 is near the position in which the star coupler 2-i has been installed or is to be installed, then the remote station 3-i-5 may be connected directly to the star coupler 2-i with no branch optical fiber.

Figure 15:
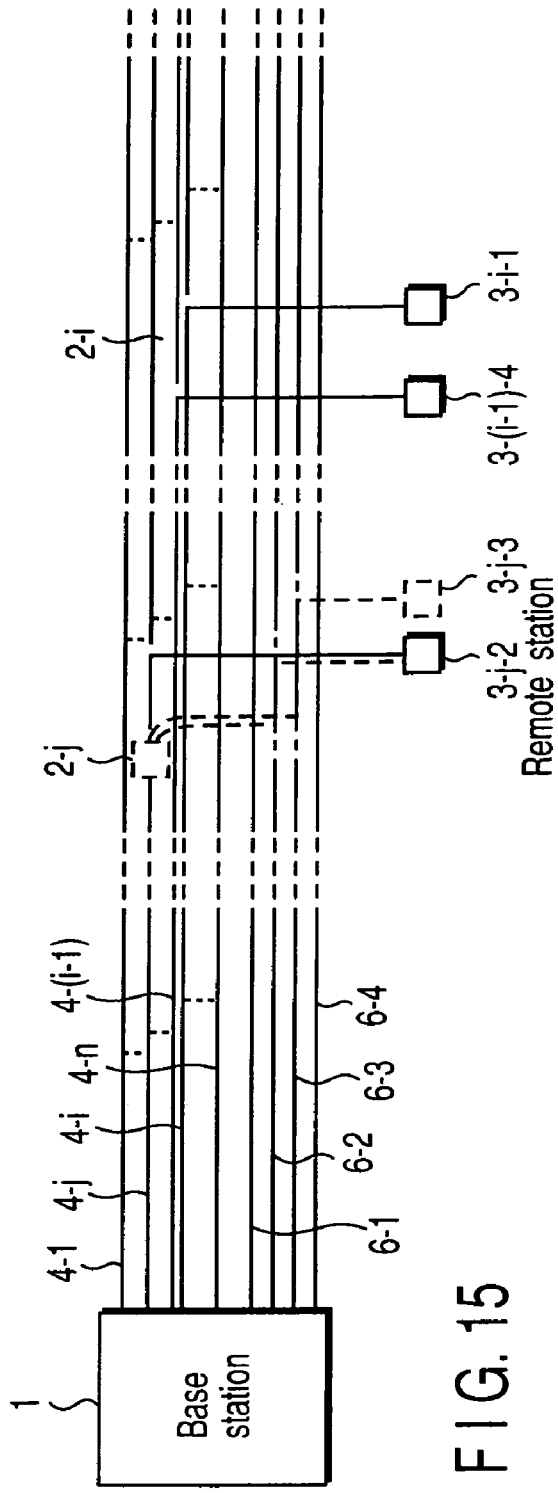
FIG. 15 shows an optical communications system according to a developing form of the present invention.

FIG. 15 shows an optical communications system in which at first a remote station is directly connected to a trunk optical fiber. When a remote station 3-i-1 is installed, a trunk optical fiber 4-i connected to the first base station 1 is cut in the vicinity of the position in which the remote station 3-i-1 is installed and directly connected there to that remote station. The same is true of any other remote station, e.g. remote station 3-j-2. If there is a remote station which has been installed at a point not much apart from a remote station to be installed anew, they may be grouped and connected to the same star coupler through branch optical fibers, depending on their position and distance. That is, prior determination is made of, on the assumption that all the remote stations have been installed, their positions and grouping and the positions of star couplers. If remote stations in the same group as a remote station to be installed anew have been installed, then the remote station is connected to the same star coupler by a branch optical fiber. At this point, if the star coupler has not been installed, it is installed.

In FIG. 15, suppose that a remote station 3-j-3 is installed anew. The remote station 3-j-3 belongs to the same group as the already installed remote station 3-j-2 in terms of position and grouping. At this point, a star coupler 2-j is connected anew to the trunk optical fiber 4-j as indicated by broken lines in FIG. 15. The star coupler 2-j is inserted in the previously determined position. For example, it is installed in the position nearer to the base station than the position determined for a remote station 3-j-1 which is not scheduled for installation. In that case, the position in which the star coupler 2-j is to be inserted and the position at which the remote station 3-j-2 was connected to the trunk optical fiber 4-j may differ. Thus, the trunk optical fiber 4-j is cut anew at a position different from the position at which it was cut for connection of the remote station 3-j-2 and connected there to the star coupler 2-j. The remote station 3-j-2 is disconnected from the trunk optical fiber 4-j temporarily and then connected to the star coupler 2-j through the branch optical fiber 6-2.

Whether or not to reconnect that portion of the trunk optical fiber 4-j which has been cut for connection of the remote station 3-j-2 depends on other factors, e.g., the type of failure protection configuration, the network operation policy (the portions that are left cut should be reduced to a minimum with the facility of future network operation consideration), etc.

When installing a remote station 3-(i−1)-4, an already installed remote station 3-i-1 exists near by. They belong to different groups in a previously determined relationship of remote station groups. Thus, even if the remote stations 3-i-1 and 3-(i−1)-4 are in close proximity to each other, the remote station 3-(i−1)-4 is directly connected to the trunk optical fiber 4-(i−1) without installing a star coupler anew. Alternatively, if a remote station which belongs to the same group as the remote station 3-(i−1)-4 has already been installed, a star coupler 2-(i−1) is installed anew and these remote stations are connected to that star coupler by branch optical fibers as in the case of remote stations 3-j-2 and 3-j-3.

To install a remote station that belongs to the same group as the remote station 3-i-1, a star coupler 2-i is installed. Depending on the previously determined final configuration, the remote station 3-I-1 may be directly connected to the star coupler with no branch optical fiber.

In such a developing form, at first a remote station is connected to an optical transmitter/receiver in the first base station 1 in a point-to-point relationship. The extension of remote stations in the same group causes the optical transmitter/receiver to correspond point-to-multipoint with the remote stations. Thus, the data transmission/reception method in the base station and the remote stations must be compatible with both the point-to-point and point-to-multipoint relationships. For example, although the insertion of a star coupler results in a significant increase in the loss of an optical transmission path, it is required that any increase in the optical transmission loss have virtually no effect on data transmission/reception. One approach is to use an optical receiver adaptable for either case. If it is difficult for an optical transmitter/receiver for increased loss in the transmission path is provided, in which case, in the absence of a star coupler, an attenuator is inserted to provide the same level of loss as in the presence of the star coupler. In addition, since there is the possibility that transmit data bound for two or more remote stations are multiplexed, each remote station should be equipped with a transmitter/receiver that is suitable for multiplexed data. For example, in the case of a subcarrier-multiplexing system, each remote station should be equipped with a filter that filters a subcarrier frequency allocated to itself but blocks other subcarrier frequencies.

Figure 16:
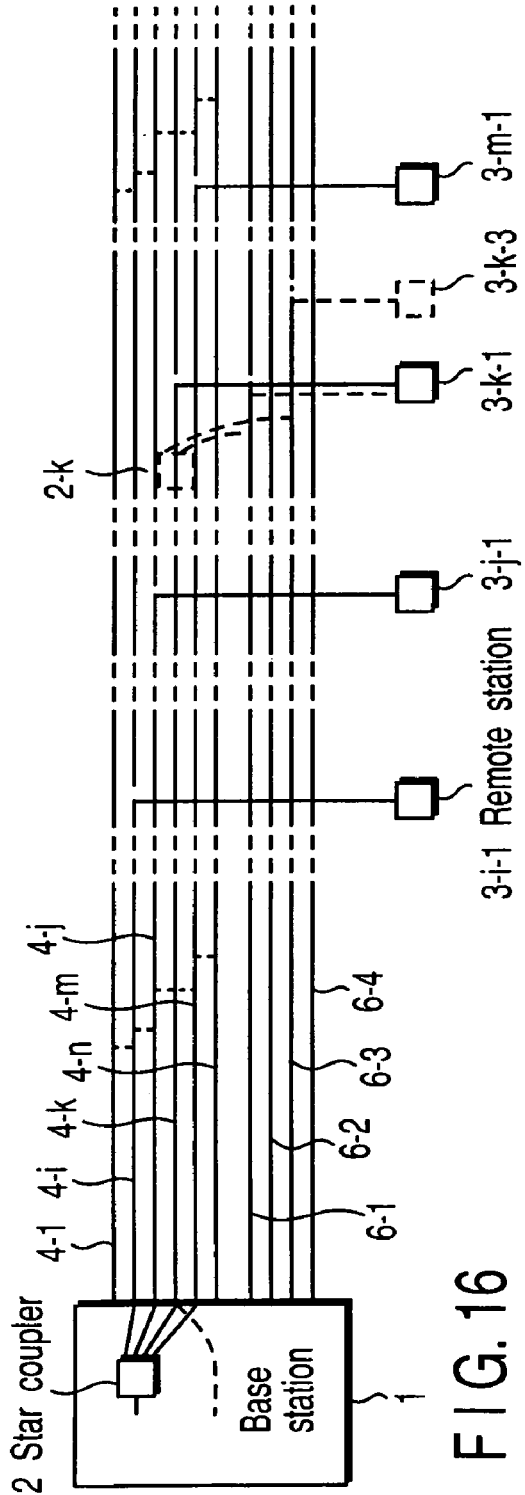
FIG. 16 shows an optical communications system according to a developing form of the present invention.

FIG. 16 illustrates an optical communications system which allows for various developed forms in accordance with the principles of the present invention. At the installation time, a star coupler 2 is installed in the first base station 1 to use the trunk optical fibers as the branch optical fibers. In the example of FIG. 16, the star coupler 2 is of a 1×4 type. When three remote stations 3-i-1, 3-j-1 and 3-k-1 are installed at first, the trunk optical fibers 4-i, 4-j and 4-k are connected to the star coupler 2. For example, the trunk optical fiber 4-i is cut in the vicinity of the remote station 3-i-1 and connected thereto. The same is true of the trunk optical fibers 4-j and 4-k.

To implement more remote stations, there are two ways. If no remote station that belongs to the same group as a new one has been installed, the new one is connected to a unused trunk optical fiber. For example, to install a remote station 3-m-1, the trunk optical fiber 4-m is connected to the star coupler 2, then cut in the vicinity of the remote station 3-m-1 and connected there thereto. To install more remote stations when no port of the star coupler 2 is left unused, a new star coupler and its associated optical transmitter/receiver are simply installed in the first base station 1.

Next, a description is given of the case where a remote station that belongs to the same group as a new one has been installed. Assuming a remote station 3-k-3 to be installed anew, a remote station 3-k-1 in the same group has already been installed. In such a case, the trunk optical fiber 4-k is disconnected from the star coupler 2 in the first base station 1 and then connected to a new optical transmitter/receiver prepared in the base station. The trunk optical fiber 4-k is cut at a point in the vicinity of the remote station 3-k-1 or at a point which is nearer to the base station 1 than the remote station 3-k-1 and far from the position in which a remote station in the adjacent group is scheduled for installation and connected there to a new star coupler 2-k. The remote station 3-k-1 is temporarily disconnected from the trunk optical fiber 4-k. The remote stations 3-k-1 and 3-k-3 are connected to the star coupler 2-k through branch optical fibers (or directly) as in the case of FIG. 1.

The advantages of the configuration of FIG. 16 are that: the base station requires fewer optical transmitters/receivers because the PON form has been taken from the beginning; and the base station and the remote stations each have only to be equipped with an optical transmitter/receiver compatible only with the PON configuration and there is no need for an optical transmitter/receiver which is also adaptable for the point-to-point relationship between the base station and the remote station.

Figure 17:
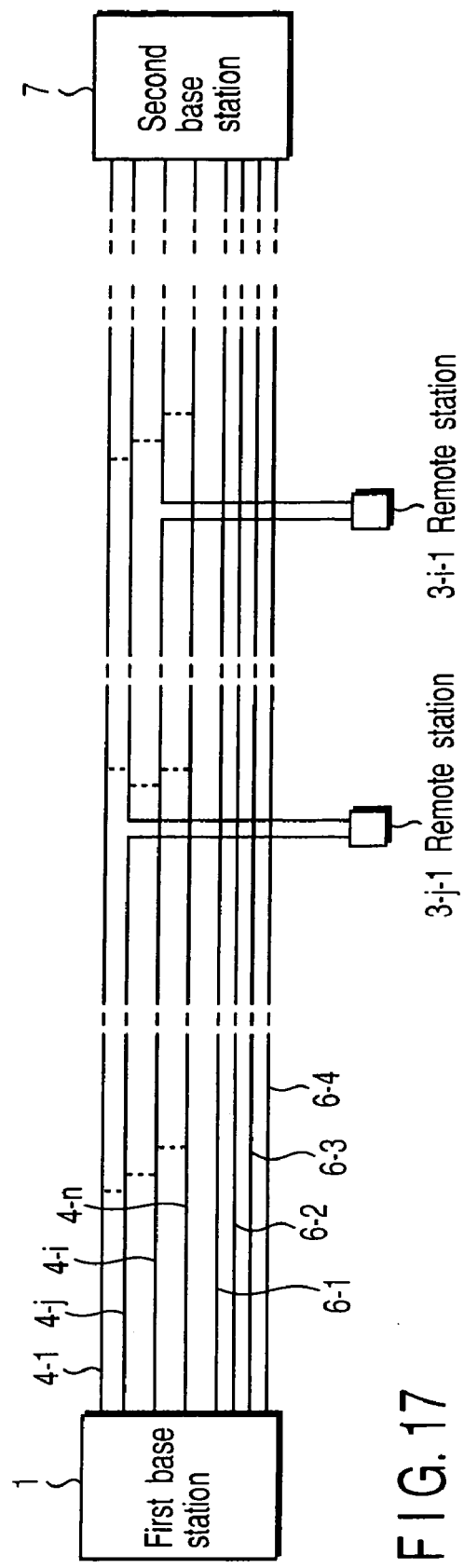
FIG. 17 shows an optical communications system according to a developing form of the present invention.

With a failure protection system, a failure protection configuration must be maintained even under course of development. In the configuration of FIG. 15 or 16, the configuration of FIG. 17 is recommended. An optical fiber cable containing trunk optical fibers is laid between the first base station 1 and the second base station 7. The trunk optical fiber 2-i is cut in the vicinity of the remote station 3-i-1 and connected there thereto. The remaining portion of the trunk optical fiber 2-i which is connected to the second base station 7 is connected to the second-system port of the remote station 3-i-1. This is the initial state. If the final failure protection configuration is like the third or fourth aspect (FIG. 7 or 13), when a star coupler is installed to add a remote station, the failure protection configuration should be provided which corresponds with the configuration including the star coupler.

With such a configuration as shown in FIG. 13 or 14 in which star couplers have been installed from the beginning, it is necessary only that the same failure protection system as the final configuration be built from the beginning.

Figure 18:
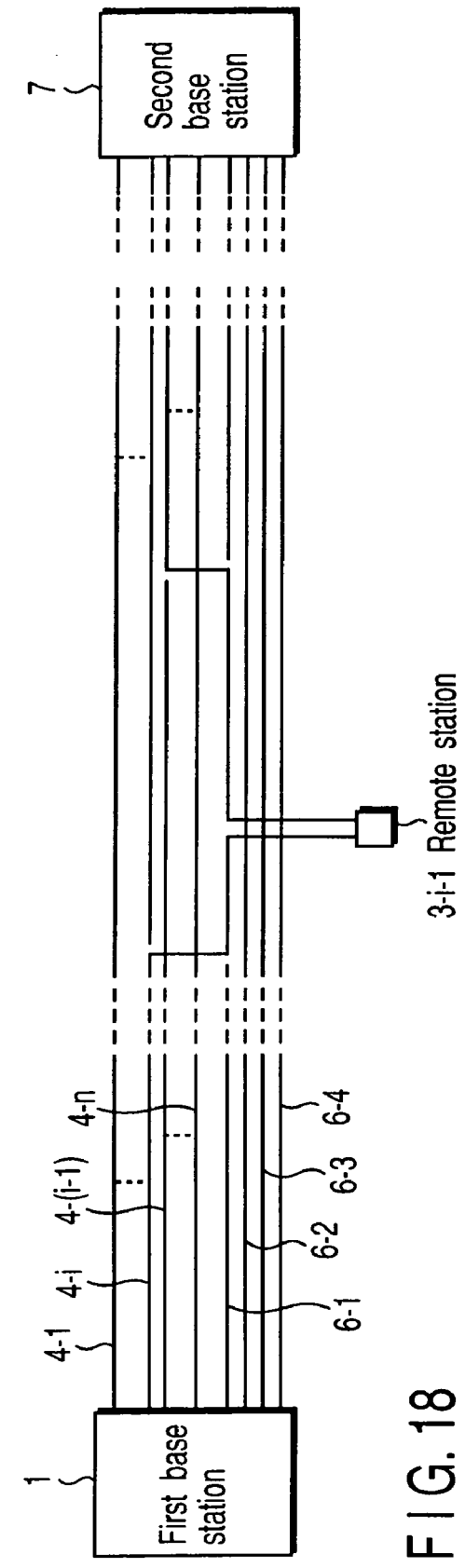
FIG. 18 shows an optical communications system according to a developing form of the present invention.

When the failure protection system is such that, as shown in FIG. 9, 10, 11, or 12, a group of remote stations is connected to the first base station 1 and the second base station 7 by different trunk optical fibers, the following manner is recommended. Basically, a failure protection system is also build beforehand in a form close to the final configuration. A configuration as shown in FIG. 18 will be described.

The trunk optical fiber 4-i connected to the first base station 1 is cut at a point at which the star coupler is to be installed in the final configuration and connected there to the branch optical fiber 6-1, which is in turn cut in the vicinity of the remote station 3-i-1 and connected thereto. The trunk optical fiber 4-(i+1), which is to be connected to the adjacent group of remote stations, is cut at a point at which a star coupler is to be inserted. The cut end of that portion of the trunk optical fiber 4-(i+1) which is connected to the second base station 7 is connected to the branch optical fiber 6-1. The unused cut end of the branch optical fiber 6-1 in the vicinity of the remote station 3-i-1 is connected to the second-system port thereof.

In such a configuration, when a star coupler is installed and connected to the first base station to add a remote station, another star coupler is also installed simultaneously to connect that star coupler to the second base station. Thus, it becomes possible to develop the configuration while maintaining the failure protection configuration.

So far, the present invention has been described without distinguishing between the upstream system (transmission from the remote stations to the base station) and the downstream system (transmission from the base station to the remote stations). If an optical communications system to which the present invention is applied is configured to have an uplink and a downlink, the inventive configuration is provided for each of the uplink and the downlink. Of course, it is also possible to make upstream and downstream transmissions between the base station and a remote station over a common optical fiber.

Figures 19A, 19B:
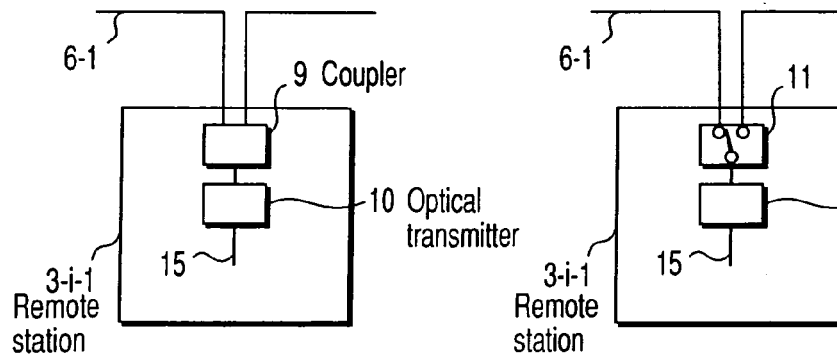
FIGS. 19A to 19C show the arrangements of the remote stations used in a dual communication system of the present invention.
Figure 19C:
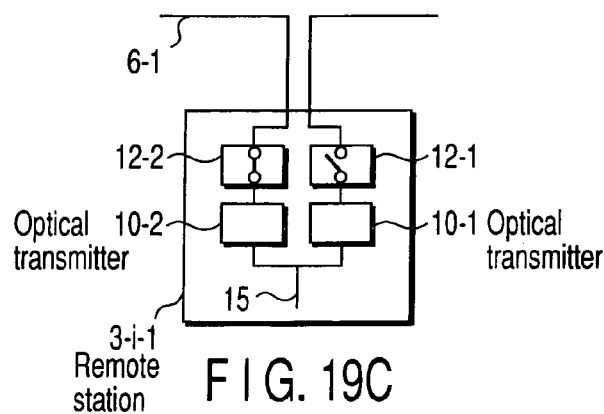

Depending on the failure protection configuration, each remote station may have a second-system port for connection to the second base station. A method of switching between two ports will be described below. FIGS. 19A, 19B and 19C illustrate examples of optical transmitting units in the dual-port remote stations. In the example of FIG. 19A, a 1×2 coupler 9 is used to output light to two ports. The remote station 3-i-1 is equipped with an optical transmitter 10. A signal to be sent to the base station is input to an input terminal 15 and then converted into an optical signal by the optical transmitter 10. The output of the optical transmitter is output to the two ports through the coupler 9. This configuration uses only the star coupler and hence is low in cost. In addition, it is simple because of no need of switching control.

In the example of FIG. 19B, an optical switch 11 is used. A signal input to the input terminal 15 is converted by the optical transmitter 10 into an optical signal, which is in turn output to either of the two ports through the optical switch 11 as required. This configuration uses an optical switch and is therefore free from branching loss as caused by a star coupler, allowing higher quality transmissions.

In the example of FIG. 19C, two optical transmitters 10-1 and 10-2 are provided. A signal input to the input terminal 15 is converted by the optical transmitters 10-1 and 10-2 into an optical signal. The optical signal, which may be output to the two ports, is output through one of the on-off optical switches 12-1 and 12-2 to the corresponding one of the two ports as shown.

Figures 20A, 20B:
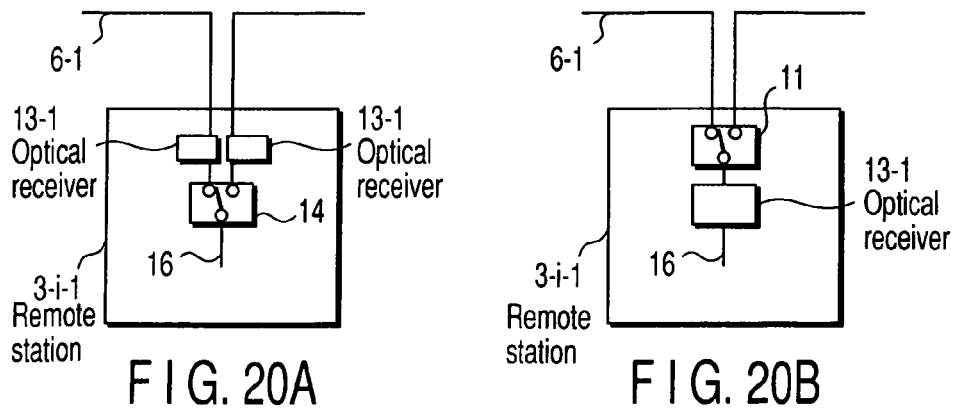
FIGS. 20A and 20B show the arrangements of the remote stations in a failure protection configuration of the present invention.

FIGS. 20A and 20B show configurations of the optical receiving unit of the dual-port remote station. In the configuration of FIG. 20A, optical signals received at the two ports are applied to optical receivers 13-1 and 13-2 for optical-to-electrical conversion. A switch 14 is used to make a choice between the electrical outputs of the optical receivers and provide the choice to an signal output terminal 16. In FIG. 20A, the switch used is a select switch of 2×1 type to make a choice from two inputs. The switch may be of a 2×2 type which enables a signal that is not output to the output terminal 16 to be output to another terminal, for the purpose of, for example, checking to ensure that the failure protection configuration functions properly.

In the configuration of FIG. 20B, a 2×1 optical switch is used to switch between two ports. An optical input selected by the switch is output to an optical receiver 13 where it is converted into an electrical signal, which is in turn output to the signal output terminal 16.

Next, a first embodiment of a fifth aspect will be described with reference to FIG. 21 which illustrates a bus network configuration. An trunk optical fiber 4 is laid between the first base station 1 and the second base station 2 to form a passive optical network (PON) together with a plurality of remote stations 3-x (x=1, 2, . . . , n). In the normal bus type of passive optical network, a trunk optical fiber is connected to one base station and accommodates two or more remote stations, whereas, in the configuration of FIG. 21, two base stations are connected to a trunk optical fiber 4. In such a configuration, couplers 5-1 to 5-n are 2×2 couplers in order to allow each remote station to receive downstream signals from any of the base stations and to send upstream signals to any of the base stations. Between the first and second base stations is set up a communication line 17 that takes a different route from the trunk optical fiber 4. The communication line may be an optical fiber transmission line that directly connects the first and second base stations, but, as shown in FIG. 22, should preferably be a communication circuit which passes through an exchange 18 which is the host node of the first and second base stations.

The operation will be described with reference to FIG. 22. The remote station 3-x usually makes communications with the first base station 1 and, in the event of a failure in the communication path that makes it impossible to make communications with the first base station, switches into communications with the second base station 7. For example, in case where the trunk optical fiber 4 has been broken between the couplers 5-1 and 5-2, the remote station 3-1 will continue communications with the first base station 1, but the remote stations 3-2 to 3-n switch into communications with the second base station 7.

Various switching procedures are possible. One procedure is as follows: Upon detecting stopping of signals from the first base station, each remote station switches the upstream signal path from the direction of the first base station to the direction of the second base station and then notifies the second base station that a failure has occurred in communications with the first base station. Upon receipt of the notification, the second base station notifies the exchange 18 to that effect over an exchange connect line 19-2. The exchange 18 then informs the first base station over an exchange connect line 19-1 that the failure of the remote stations to communicate with the first base station has occurred. The exchange performs communications circuit switching so that remote stations that need switching can make communications with the second base station 7 and notifies the first base station 1 and the second base station 7 with the matter. As for downstream signals, the remote stations are switched to receive signals from the second base station at the time signals from the first base station stopped.

In another procedure, upon detecting stopping of a signal from a remote station, the first base station notifies the exchange to the effect and requests the exchange to switch communications of that remote station from with the first base station 1 to with the second base station 7. In response to the notification and request, the exchange 18 notifies the second base station 7 of communication switching. In response to the notification, the second base station notifies the remote station that needs switching that it will be switched into communications with the second base station. The remote station switches the communications path from the direction of the first base station to the direction of the second base station. The second base station notifies the exchange 18 that the remote station has been notified. In response to this, the exchange performs communications circuit switching so that the remote station can make communications with the second base station.

Figure 21:
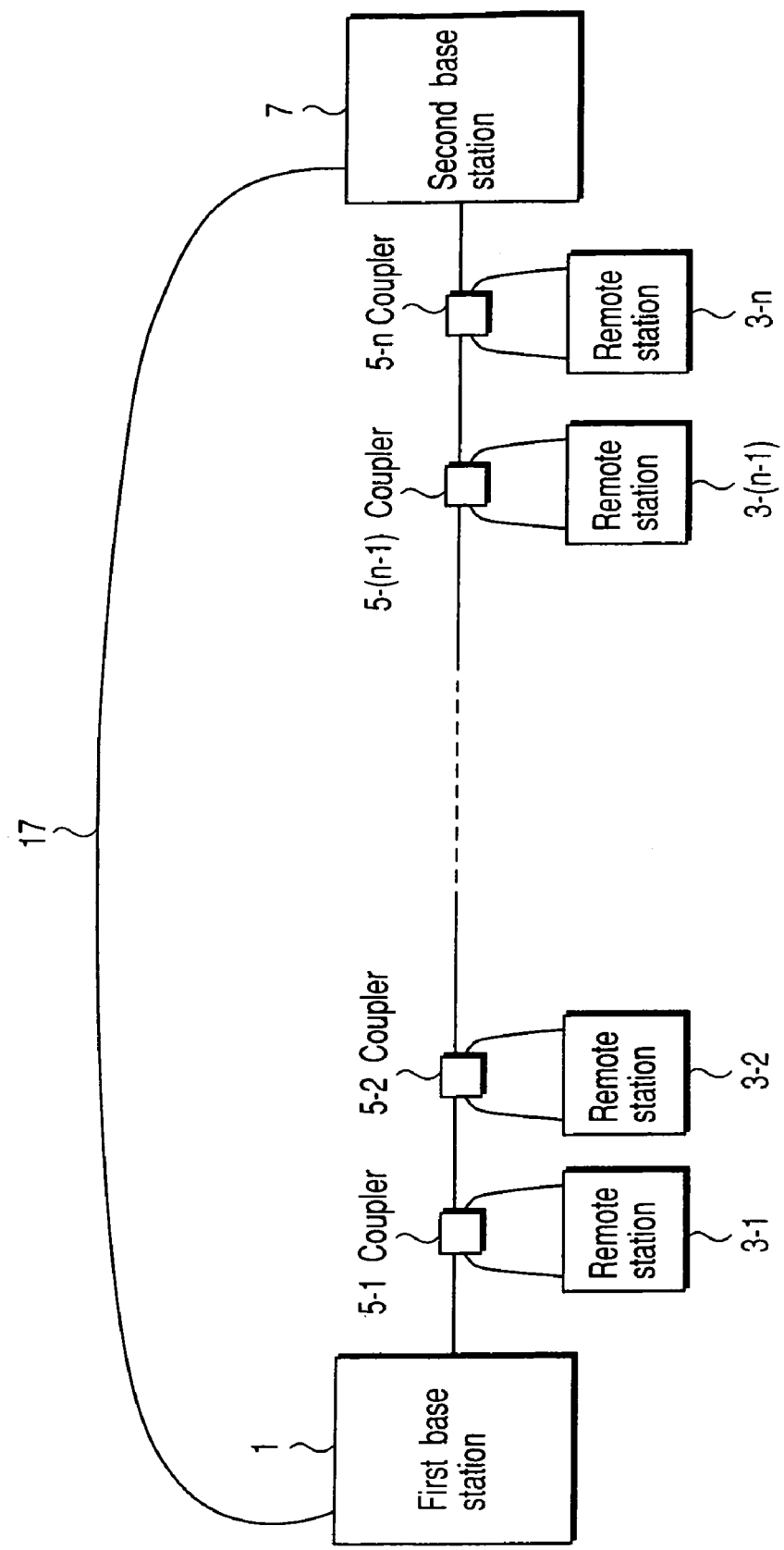
FIG. 21 shows an optical communications system according to a first embodiment of a fifth aspect of the present invention.

When the first and second base stations 1 and 7 are directly connected with each other by the communication line 17 as shown in FIG. 21, the first base station 1 switches the communications circuit to the second base station 2, which, in the above procedures, is performed by the exchange 18.

In the event that a failure occurs in the whole of the first base station 1, all the remote stations switch the station with which they communicate from the first base station 1 to the second base station 7. In such case, the possibility of a failure in the control lines of the first base station should considered, and switching is performed in the following way. In the second embodiment of the fifth aspect shown in FIG. 22, the remote station 3-x detects that communications with the first base station 1 has stopped and then switches its optical transmission and reception systems from the direction of the first base station to the direction of the second base station. Additionally, the remote station 3-x notifies the second base station that the communications with the first base station has stopped and makes a request to it for switching. The second base station then notifies the exchange 18 that a failure has occurred in the first base station and makes a request to direct data communicated with the remote station 3-x to the second base station. The exchange then directs the data to the second base station (depending on systems, the exchange may make a request to the first base station for failure confirmation).

In the system of FIG. 21 in which the first and second base stations 1 and 7 are directly connected with each other by the communication line 17, the switching procedure remains substantially the same as the above procedure except that, upon receipt of a request for switching from the remote station, the second base station 7 makes to an exchange not shown a request to direct data communicated with the remote station to it.

Figure 25A:
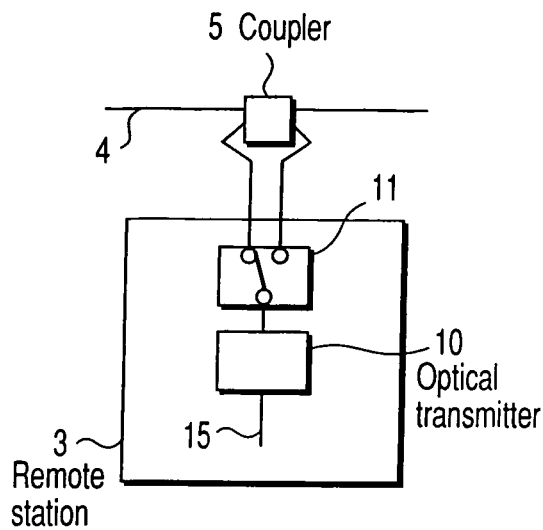
FIGS. 25A and 25B show the arrangements of the remote stations used in the communications system of the fifth aspect of the present invention.
Figure 25B:
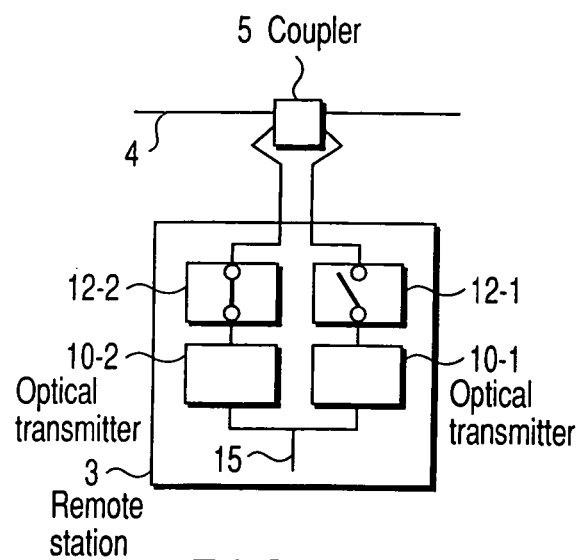

In the bus network configuration, the remote stations may be arranged as shown in FIGS. 25A, 25B, 26A and 26B. FIGS. 25A and 25B show optical transmitting units. In the arrangement of FIG. 25A, the output of optical transmitter 10 is selectively applied by optical switch 11 to either of the first ports of an optical coupler. The direction in which light travels in the trunk optical fiber depends on which of the first ports of the optical coupler the output of the optical transmitter is applied to. The optical coupler generally has very strong directivity, thus allowing such an arrangement as above to determine the direction of light transmission in the trunk optical fiber. In FIG. 25B, two optical transmitters 10-1 and 10-2 are installed to receive the same input signal. Two on-off optical switches 12-1 and 12-2 are connected to the optical transmitters to apply selectively one of the outputs thereof to the optical coupler.

Figure 26A:
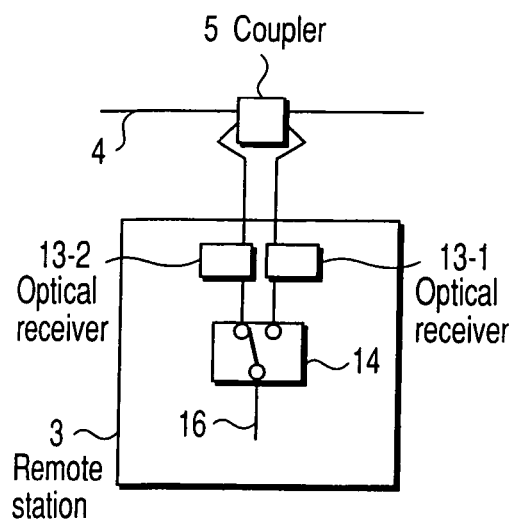
FIGS. 26A and 26B show the arrangements of the remote stations used in the communications system of the fifth aspect of the present invention.
Figure 26B:
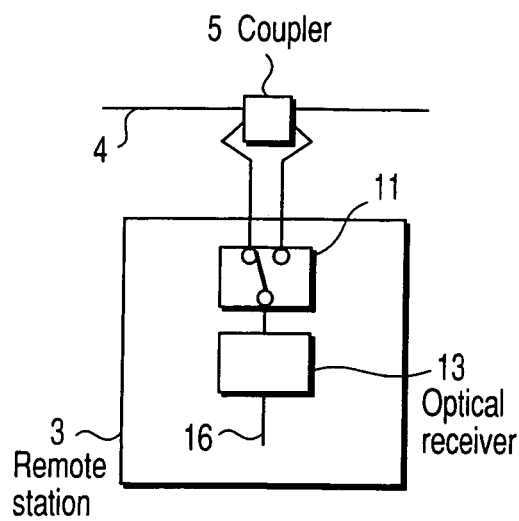

FIGS. 26A and 26B show optical receiving units. In the arrangement of FIG. 26A, optical receivers 13-1 and 13-2 receive light coming from the first and second base stations, respectively. A switch 14 selects the output of either the optical receiver 13-1 or the optical receiver 13-2. The switch 14 is of a 2×1 type, which may be replaced by a 2×2 switch for the purpose of monitoring the light signal which is not output to the signal output terminal 16. In the arrangement of FIG. 26B, a 2×1 optical switch is used to select light from either the first base station or the second base station and conduct it to an optical receiver 13.

Figure 23:
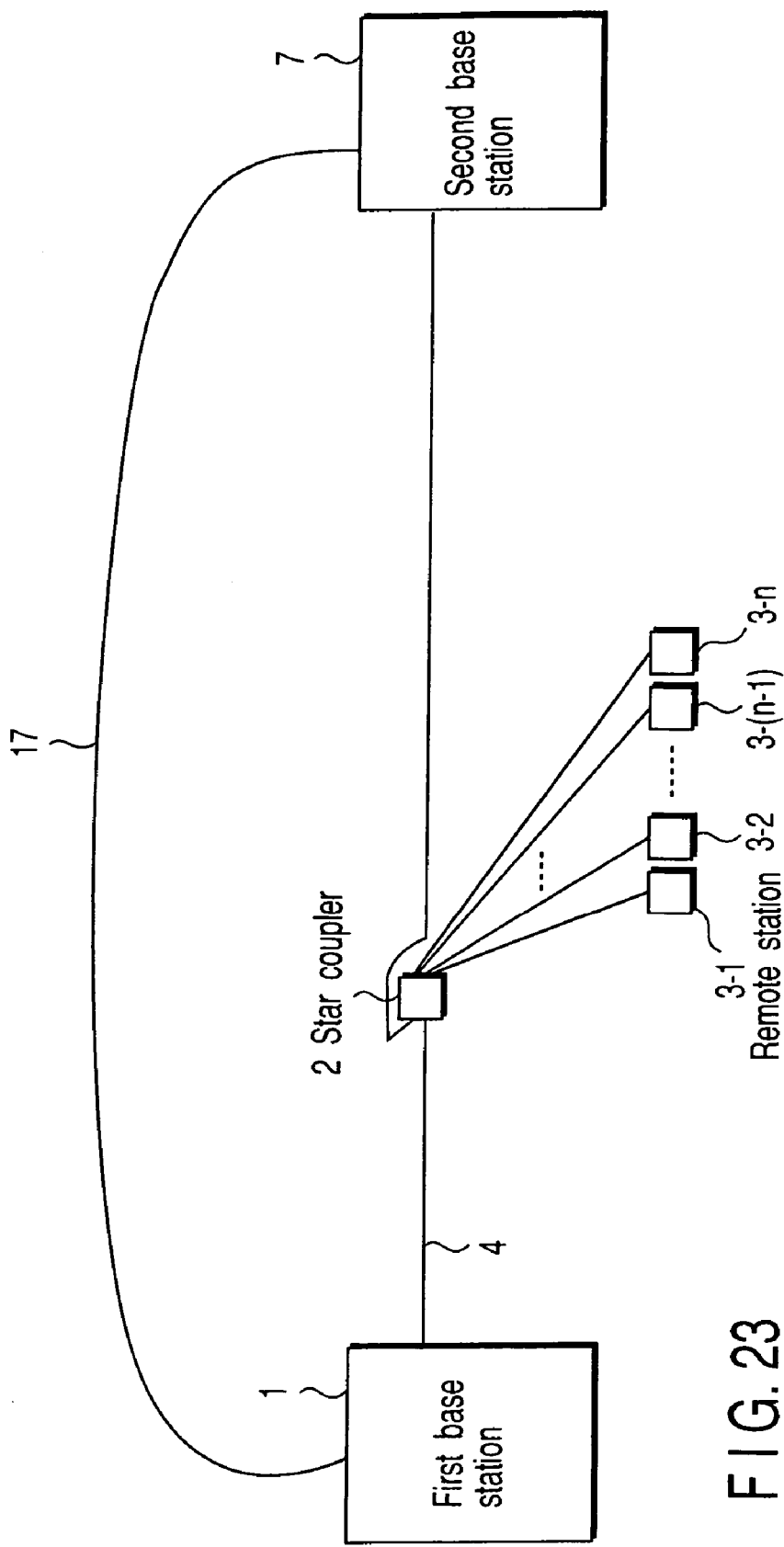
FIG. 23 shows an optical communications system according to a third embodiment of the fifth aspect of the present invention.

FIG. 23 shows a third embodiment of the fifth aspect, of the star type of PON. The trunk optical fiber 4 is laid between the first and second base stations 1 and 7. The trunk optical fiber 4 is cut halfway and connected there to a 2×n star coupler 2. More specifically, the cut end of the optical fiber connected to the first base station and the cut end of the optical fiber connected to the second base station are connected to two first ports of a 2×n star coupler 2. The n second ports of the star coupler 2 are connected to remote stations 3-1 to 3-n. The operation and procedure in such a system remain unchanged from those in the bus network system.

Figure 24:
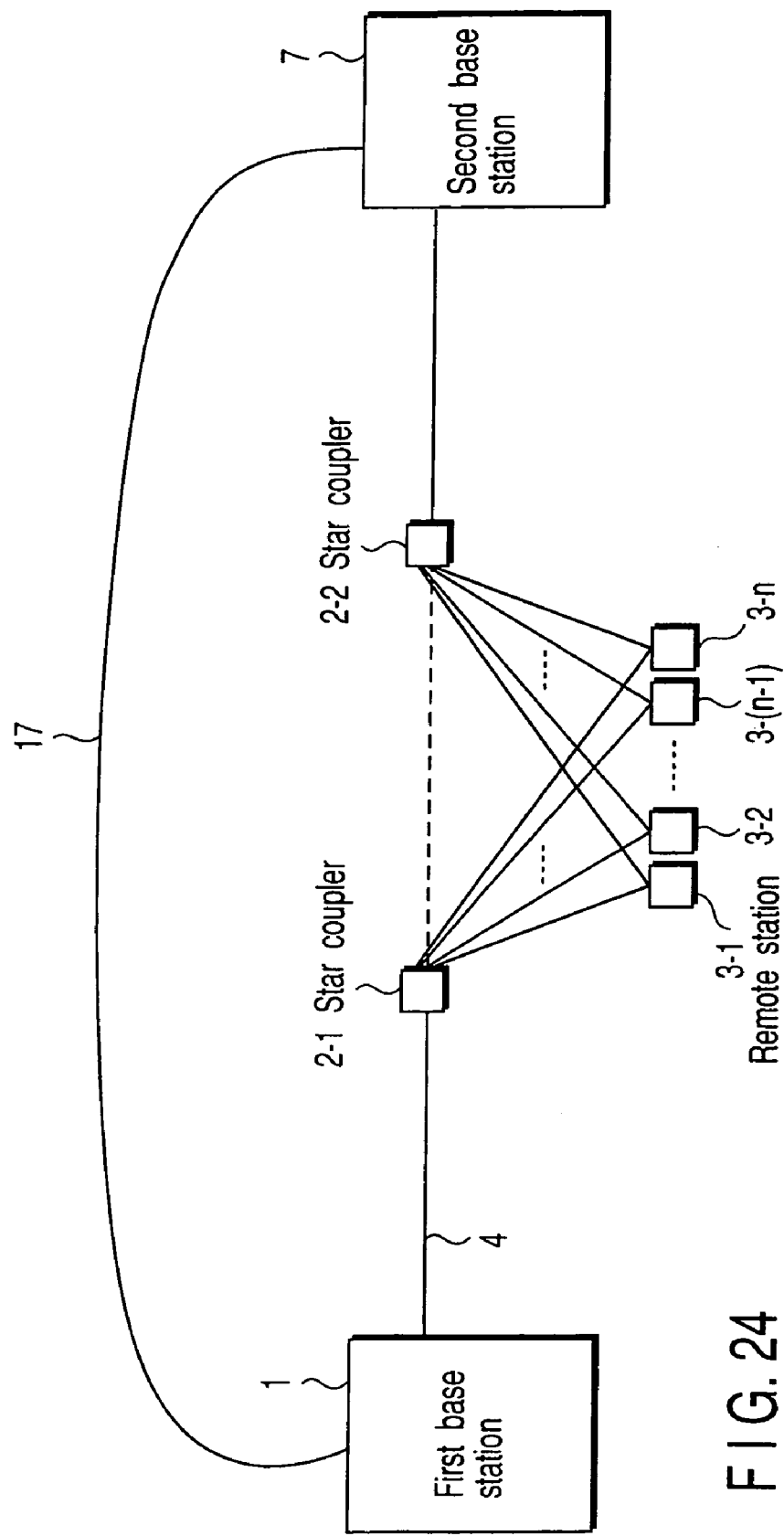
FIG. 24 shows an optical communications system according to a fourth embodiment of the fifth aspect of the present invention.

FIG. 24 also shows a fourth embodiment of the fifth aspect, of the star type of PON. The trunk optical fiber 4 laid between the first and second base stations is cut at two intermediate points. A star coupler 2-1 is connected to the cut end of the trunk optical fiber connected to the first base station, and a star coupler 2-2 is connected to the cut end of the trunk optical fiber connected to the second base station. The star couplers, which are 1×n couplers, have their n second ports connected to remote stations 3-1 to 3-n. The arrangement of each remote station in the arrangement of FIG. 24 remains unchanged from that in FIGS. 19 and 20. The switching operation and procedure remain unchanged from those in the bus network system.

According to the present invention, as described above, the use of a multi-optical fiber cable laid between two separate base stations to configure a failure protection passive optical network architecture allows the fiber utilization to be improved. Moreover, since each remote station belongs to two separate base stations, communications can be continued even in the event that one of the base stations has failed, and a highly reliable system is constructed.

Furthermore, in the case of that two or more remote stations are arranged in a line, the repeated use of branch optical fibers allows the number of remote stations connectable to one trunk optical fiber to be increased through a star network topology while not giving up the advantages of bus networks (no need of building a fiber from a point of branch to a remote station). Also any combination of the above embodiments is available.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A remote station comprising:
   a connection port connected to a port of a coupler connected to a passive optical network having a trunk optical fiber connected between first and second base stations to receive downstream signals from any of the first and second base stations and to send upstream signals to any of the first and second base stations, and a communication circuit, which passes through an exchanger which is a host node of the first and second base stations, being provided for forming a different route from the trunk optical fiber;
   an optical transmitter unit connected to the connection port; and
   an optical receiver unit connected to the connection port.

2. A method for communicating a remote station including an optical transmitter unit and an optical receiver unit with first and second base stations, the method comprising:

connecting a connection port of the remote station to a port of a coupler connected to a passive optical network having a trunk optical fiber connected between the first and second base station to receive downstream signals from any of the first and second base stations and to send upstream signals to any of the first and second base stations; and providing, between the first and second base stations, a communication circuit, which passes through an exchanger which is a host node of the first and second base stations to form a different route from the trunk optical fiber.

* * * * *